(12) United States Patent
Kratzer

(10) Patent No.: US 12,281,955 B2
(45) Date of Patent: Apr. 22, 2025

(54) METHOD FOR MEASURING MASS DISTRIBUTION WITHIN OBJECTS USING MOMENT-OF-INERTIA

(71) Applicant: OWLFLY LLC, Frenchtown, NJ (US)

(72) Inventor: Chris Alice Kratzer, Frenchtown, NJ (US)

(73) Assignee: OWLFLY LLC, Frenchtown, NJ (US)

( * ) Notice: Subject to any disclaimer, the term of this patent is extended or adjusted under 35 U.S.C. 154(b) by 315 days.

(21) Appl. No.: 17/976,262

(22) Filed: Oct. 28, 2022

(65) Prior Publication Data

US 2024/0011861 A1     Jan. 11, 2024

Related U.S. Application Data

(60) Provisional application No. 63/359,623, filed on Jul. 8, 2022.

(51) Int. Cl.
    *G01M 1/10*      (2006.01)

(52) U.S. Cl.
    CPC ..................... *G01M 1/10* (2013.01)

(58) Field of Classification Search
    CPC ....................................... G01M 1/10
    See application file for complete search history.

(56) References Cited

U.S. PATENT DOCUMENTS

| | | | |
|---|---|---|---|
| 3,106,091 A | 10/1963 | Korr | |
| 3,693,413 A | 9/1972 | Boynton | |
| 4,161,876 A * | 7/1979 | Carpenter | G01M 1/10 73/580 |
| 4,633,966 A * | 1/1987 | Fotheringham | B62D 15/02 303/122.04 |
| 5,313,269 A * | 5/1994 | Ponce | G01J 3/4537 356/455 |
| 5,717,205 A * | 2/1998 | Matsumoto | G01B 15/025 850/53 |
| 2006/0010965 A1 | 1/2006 | Mastinu et al. | |

FOREIGN PATENT DOCUMENTS

| | | | |
|---|---|---|---|
| CN | 105758733 B | * | 8/2018 |
| CN | 209805537 U | * | 12/2019 |
| CN | 119238405 | * | 1/2025 |
| JP | 2001033339 A | * | 2/2001 |
| WO | WO 2012/163688 A1 | | 12/2012 |

* cited by examiner

*Primary Examiner* — Octavia Hollington
(74) *Attorney, Agent, or Firm* — Birch, Stewart, Kolasch & Birch, LLP

(57) ABSTRACT

A metrological technique in which the internal mass-density distribution of an object is obtained by measuring the object's inertia. The object is rotated about at least one arbitrary axis while dynamic properties are measured. Moment of inertia is derived from the torque and angular acceleration of the object, which can be used to calculate and estimate the internal mass-density distribution of the object.

20 Claims, 24 Drawing Sheets

METHOD FOR MEASURING MASS DISTRIBUTION WITHIN OBJECTS USING MOMENT-OF-INERTIA

CROSS REFERENCE TO RELATED APPLICATIONS

This application claims priority under 35 U.S.C. § 119(e) to U.S. Provisional Application No. 63/359,623, filed Jul. 8, 2022, the disclosure of which are incorporated herein by reference in their entirety.

BACKGROUND OF THE INVENTION

1. Field of the Invention

The invention describes a non-invasive technique for measuring the internal mass distribution of rigid solid objects using Moment of Inertia (MOI). The invention is relevant primarily to the field of Metrology. The preferred use case is the detection of voids and inclusions within precision castings. However, the invention is also relevant to any field where it is useful to measure the internal mass distribution of a rigid solid object, including but not limited to Metallurgy, Precision Manufacturing, Reverse Engineering, Geology, and Paleontology.

2. Description of the Background Art

The invention herein uses rotation to measure the internal mass-density distribution of a test object.

Several patents, including U.S. Pat. No. 3,106,091 issued Oct. 8, 1963 to A. L. Korr, have been issued for methods that use rotation to measure the inertia of a test object. However, these patents do not include a method for measuring internal mass-density distribution.

Several patents, including U.S. Pat. No. 2006/0010965 A1 issued Jan. 19, 2006 to G. Mastinu and T. Doniselli, and Int. Pat. No. 2012/0163688 A1 issued Dec. 6, 2012 to R. Klopper, have been issued for methods that measure the inertia tensor using a system of sensors and actuators connected to a suspended test object, which is induced to oscillate. However, while useful for measuring overall inertial properties, these methods provide little information about the precise distribution of mass within the test object. Furthermore, these methods cannot be used to make precise measurements of the internal mass-density distribution of any test object with an internal geometry that is not known.

U.S. Pat. No. 3,693,413 (herein the '413 patent) discloses measuring the inertia of an object using a torsional pendulum in which "a taut wire is placed in tension in a rigid fixed frame . . . [a] test object is attached to an object mounting surface located above the fixed frame and concentric with the longitudinal axis of the taut wire . . . [and] [t]he period of oscillation of the torsion pendulum is determined with a magnetic reed switch and electronic period counter and the moment of inertia of the test object [is] calculated using conventional methods" (413 patent Abstract).

The invention herein serves as an alternative to destructive testing or wave-based measurement methods (such as ultrasound, X-ray, etc.), in such applications as mass-density measurements may otherwise be costly, difficult, slow, inaccurate, or dangerous.

SUMMARY OF THE INVENTION

The present invention provides a non-invasive technique to measure the internal mass distribution of a rigid solid object by utilizing the physics of rotating bodies through the measurement of basic properties and using an apparatus according to the present invention.

The present invention determines a first axis of rotation of the object, determines the force required to rotate the object about the first axis of rotation and compares this amount of force with a predetermined amount of force. If the force exceeds the predetermined amount of force (i.e., if the object is "more difficult" to rotate than expected), then it is determined that the mass of the object is distributed away from the first axis of rotation. Therefore, the average density of the object along the axis of rotation must be proportionally lower than expected.

If the force to rotate the object about the first axis of rotation is less than the predetermined amount of force (i.e., if the object is "easier" to rotate than expected), then it is determined that the mass is distributed towards from the first axis of rotation. Therefore, the average density of the object along the axis of rotation must be proportionally higher than expected. This process may be repeated for N number of axes of rotation in order to accurately measure the center of mass of the object via the average density of the object.

Each axis of rotation may be randomly determined, or may be predetermined based on the shape, size and expected center of mass of the object.

The method of the present application can be used to quickly map out the internal structure of objects. It is especially useful for detecting voids and inclusions within otherwise solid parts.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE PREFERRED EMBODIMENTS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
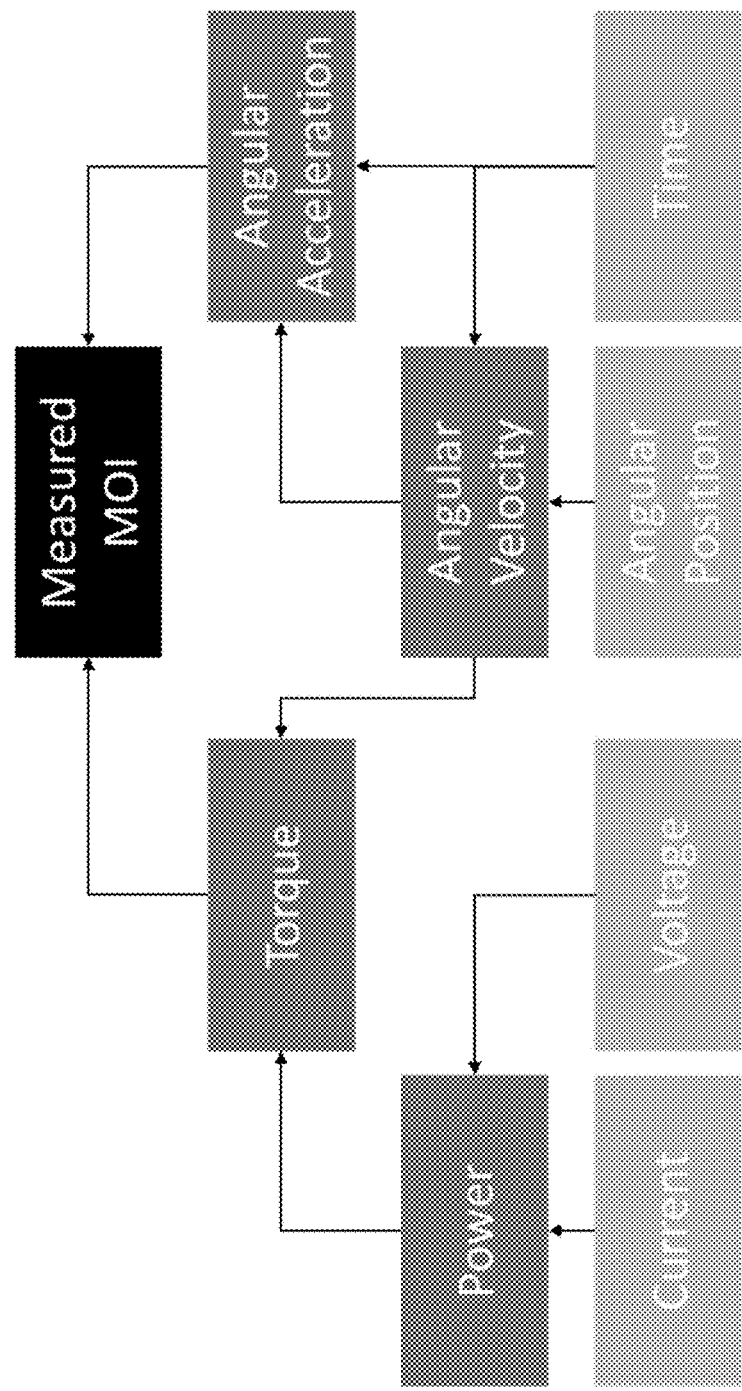
FIG. 1 is a flow chart of a method for calculating the MOI of an object according to the prior art.

The present invention will now be described with reference to the accompanying drawings, wherein the same reference numerals have been used to identify the same or similar elements throughout the several views.

Method (FIGS. 1-7)

FIG. 1 illustrates a flowchart of properties relevant to methods described in prior art for calculating the Moment of Inertia (MOI) of an object. Light gray boxes are direct measurements, gray boxes are intermediate steps, and the black box is the result.

Figure 2:
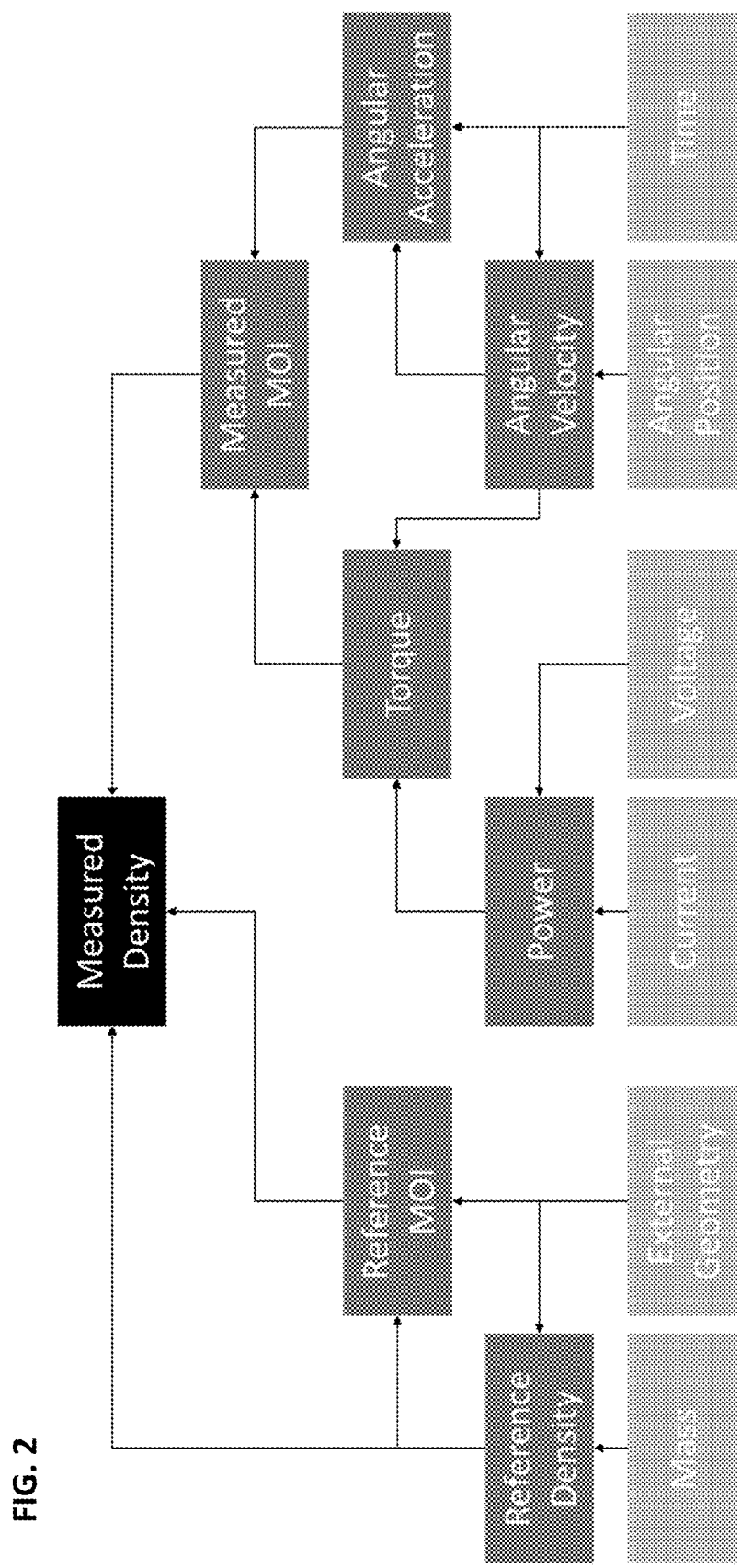
FIG. 2 is a flow chart of a method for calculating the internal density of an object according to the present invention.

FIG. 2 illustrates a flowchart of properties relevant to the present method for calculating the internal density of an object according to an embodiment of the present invention. Light gray boxes are direct measurements, gray boxes are intermediate steps, and the black box is the result. The branches to the left of "Measured Density" are novel to this method.

The estimated density of the object is calculated via the equation $\rho_{est}=\rho_{ref}*(MOI_{ref}/MOI_{meas})$, which is likewise novel to this method.

The method of the present invention does not measure center-of-mass. Instead, the method of the present invention may be used to derive center-of-mass, but that is not its intended use.

FIGS. 3-7 illustrate the fundamental embodiment of the operation of the present method.

According to FIGS. 3-7, an arbitrary rigid solid test object 31 is represented as a transparent, gray-colored sphere.

The test object used in the present method can be of any geometry, so long as the mechanical stiffness of the object is sufficiently high to avoid significant deformation under angular acceleration. For example, the present method will return accurate results for any wooden, ceramic, or metal object; but it will not return accurate results for an object made solely from an elastic polymer or foam.

Likewise, the test object must not have any large moving parts or large pockets filled with multiple fluids of varying densities. If the object has any large moving parts, or if multiple fluids are present within a single pocket, they may cause the object to behave unpredictably under angular acceleration, which may interfere with dynamic measurements of the object.

Figure 3:
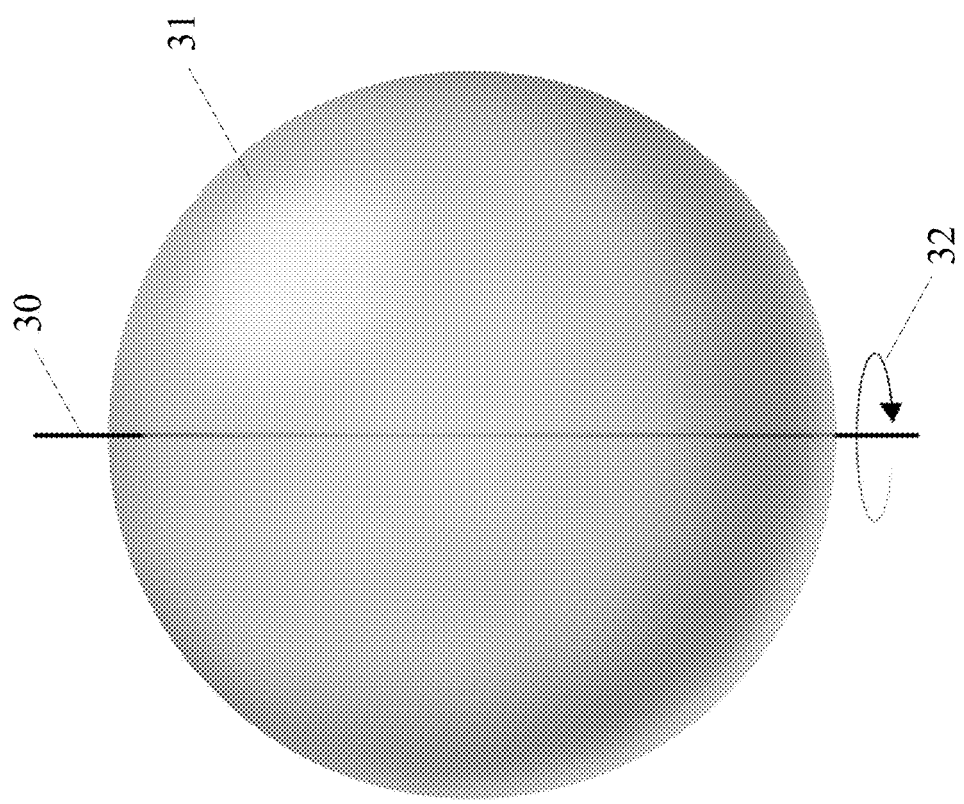
FIG. 3 is a generic diagram which demonstrates the basic operation of this Metrological technique; wherein an arbitrary object is rotated about an axis and its inertia is measured.

According to FIG. 3, an arbitrary axis 30 is represented as a line, and the angular acceleration of test object 31 about axis 30 is shown by an arrow 32. As test object 31 is accelerated about a given axis, properties relevant to the present method are measured as indicated in FIG. 2.

Figure 4:
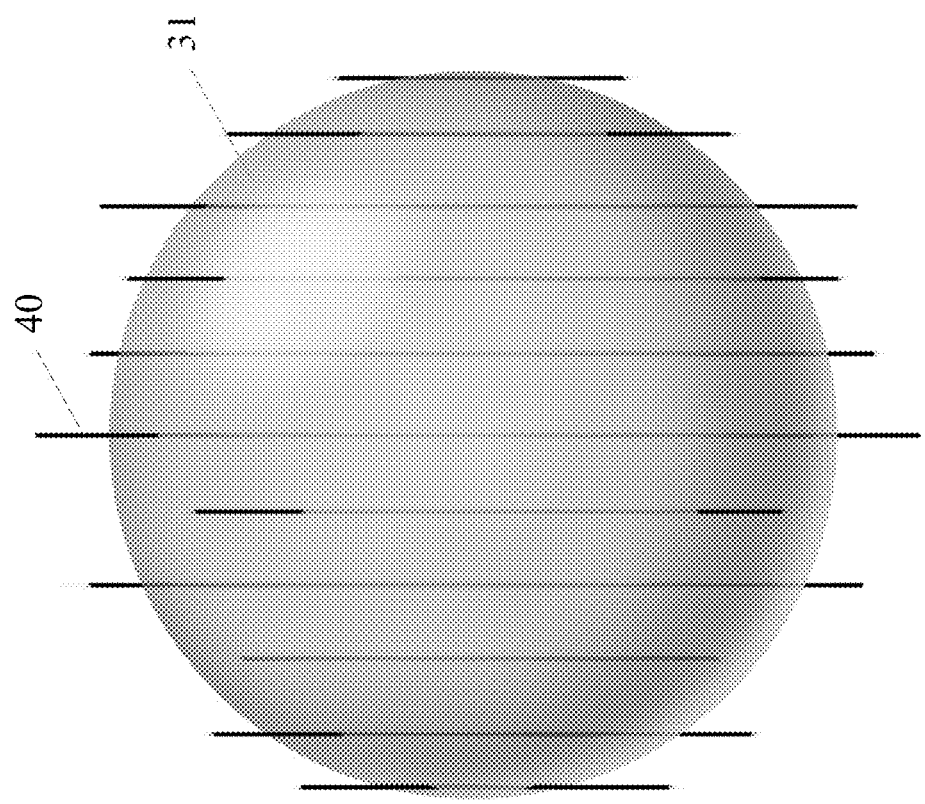
FIG. 4 shows the basic operation 3 performed many times about many parallel axes.
Figure 5:
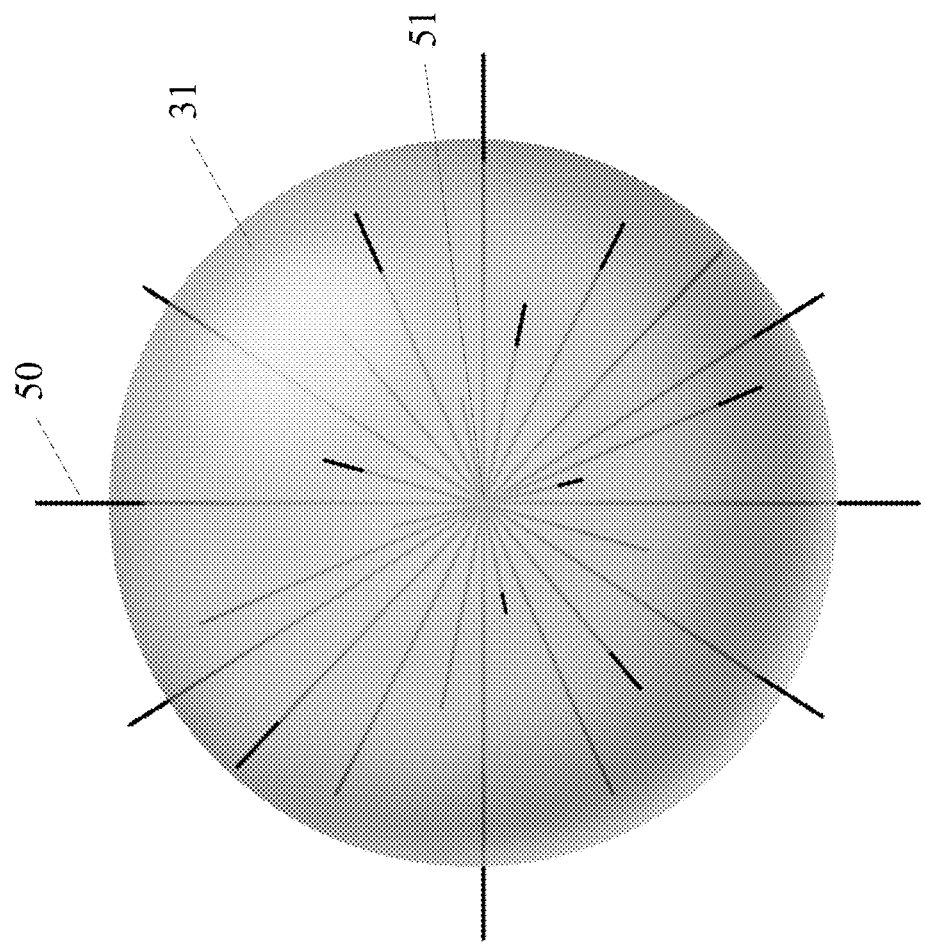
FIG. 5 shows the basic operation 3 performed many times about many axes which pass through an arbitrary center of rotation.
Figure 6:
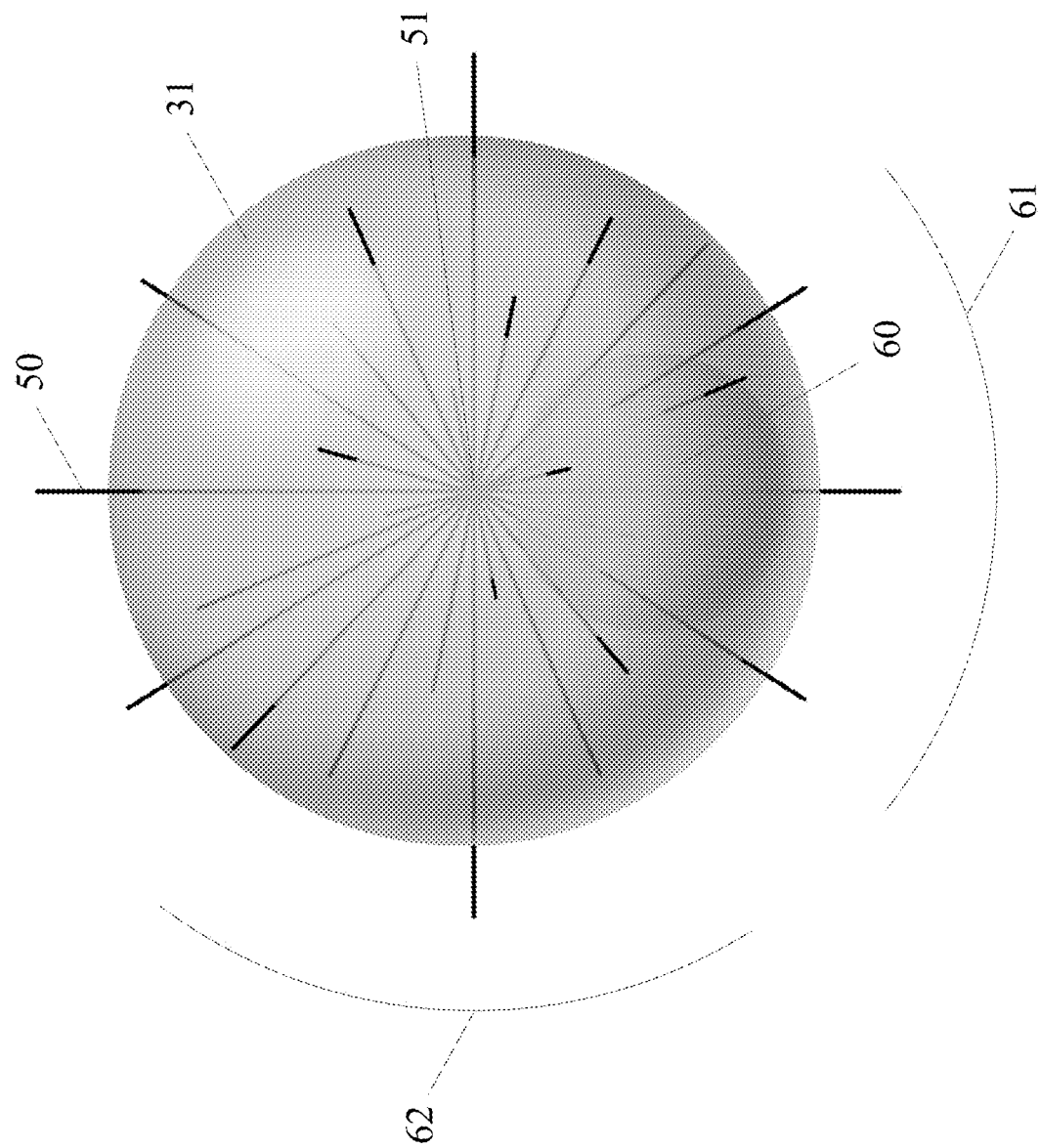
FIG. 6 shows an example with the setup as in 5, where the test object is a sphere with a pocket of relatively higher density on one side.

FIGS. 4-6 show the basic operation 3 in which the method according to the present invention is performed a plurality of times about different axes.

According to FIG. 4, an arbitrary number of lines 40 denotes a group of parallel axes passing through the test object 31. Said group of axes 40 includes all vertical lines in the respective figure for all axes included within group 40. As set forth above, the test object 31 is to be accelerated about at least one axis among the group of parallel axes passing through the test object 31.

According to FIGS. 5-6, an arbitrary number of lines 50 denotes a group of axes passing through the point 51. Said group of axes 50 includes all lines in the respective figure and an arbitrary shared point 51 for all axes included within group 50. Similarly, the test object 31 is to be accelerated about at least one axis among the group of axes passing through the point 51.

FIG. 6 illustrates a pocket of relatively high density 60 within test object 31, with axes 62 that pass through regions of lower density, which will measure a higher average MOI, and axes 61 that pass through regions of higher density (i.e., through the pocket of relatively high density 60), which will measure a lower average MOI.

The axes used in the present method can be of any quantity and spatial orientation so long as a segment of each axis passes through some part of the test object.

Figure 7:
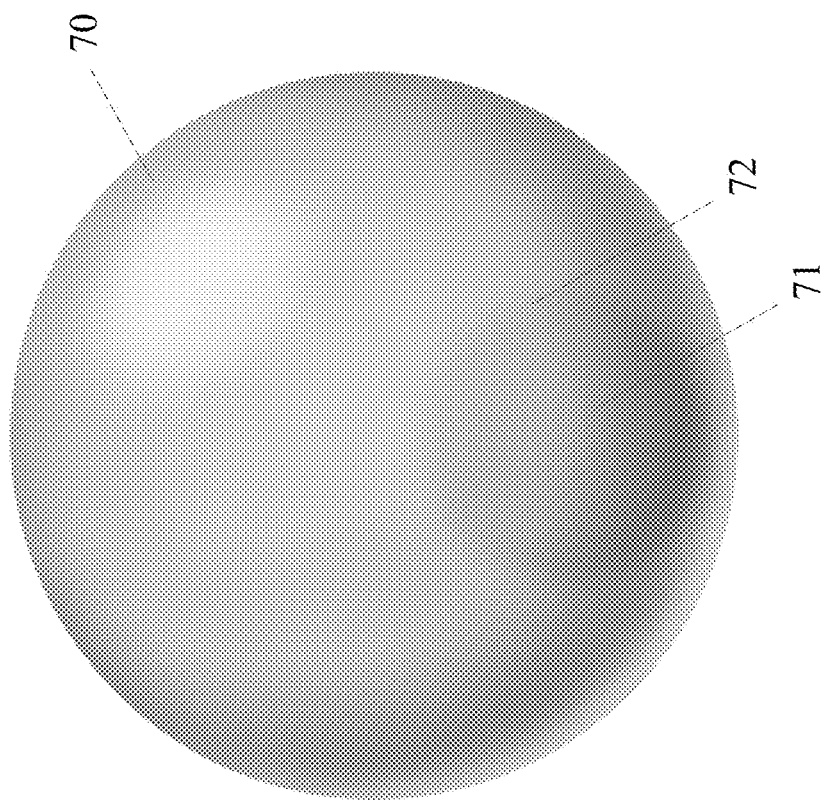
FIG. 7 is a graphic of the results of the present method from the setup as in 6, created through the compilation of measurements from many different axes and many different centers of rotation.

FIG. 7 is a graphic of the results of the present method from the setup as in FIG. 6. FIG. 7 shows the mass distribution of the object, having a region of higher density 71 corresponding to the pocket of high density 60, a region of lower density 70, and an uncertainty in the mass-density measurements 72. The graphic 7 is created through the compilation of measurements from many different axes of rotation.

Using a larger quantity of axes through a greater variety of spatial orientations will result in an improved accuracy of the density measurements.

Single-Axis Use-Case (FIGS. 8-13)

Figure 8:
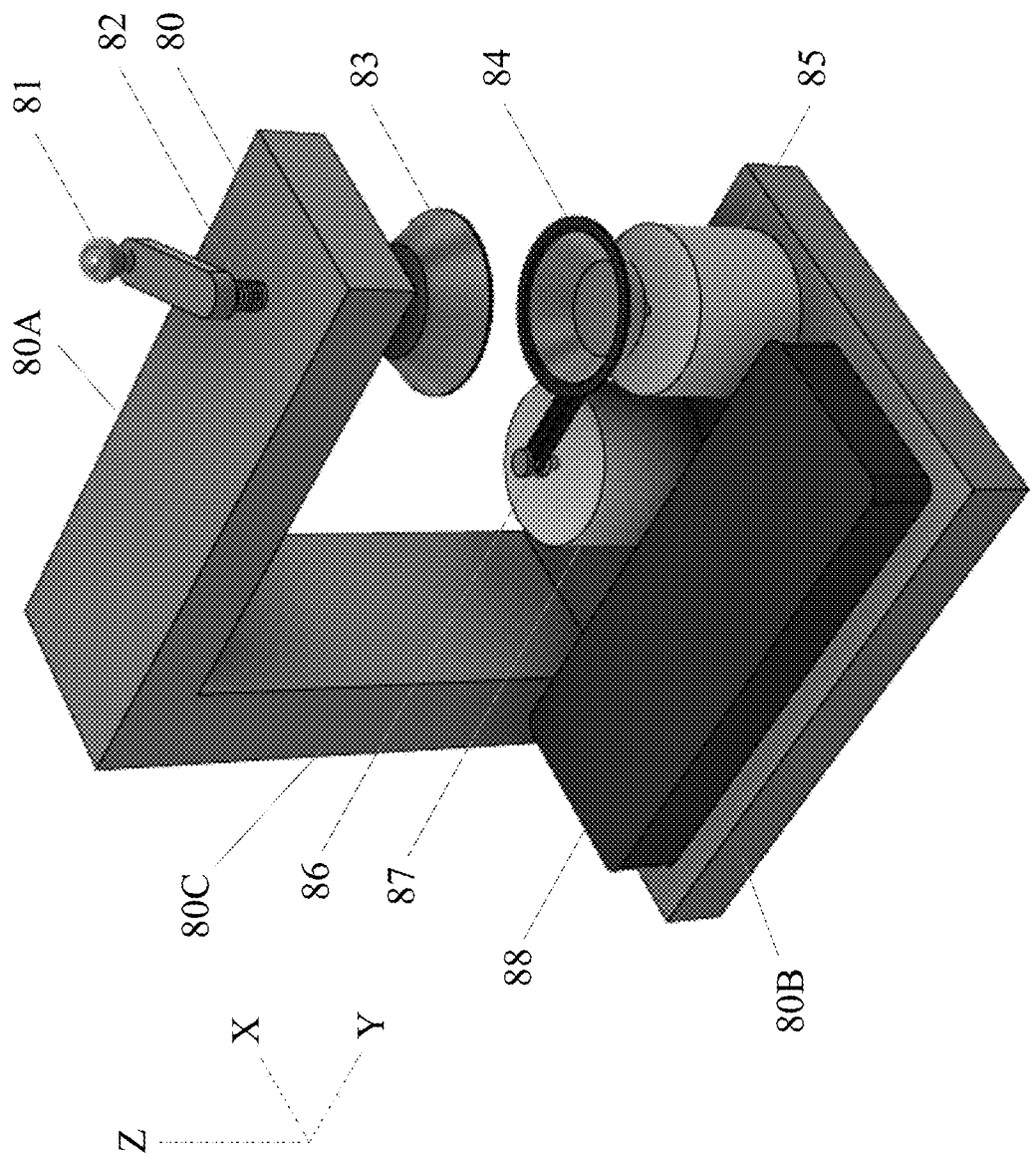
FIG. 8 is an example of a simple use-case for the present invention, where a machine measures internal density through a vertical axis.
Figure 9:
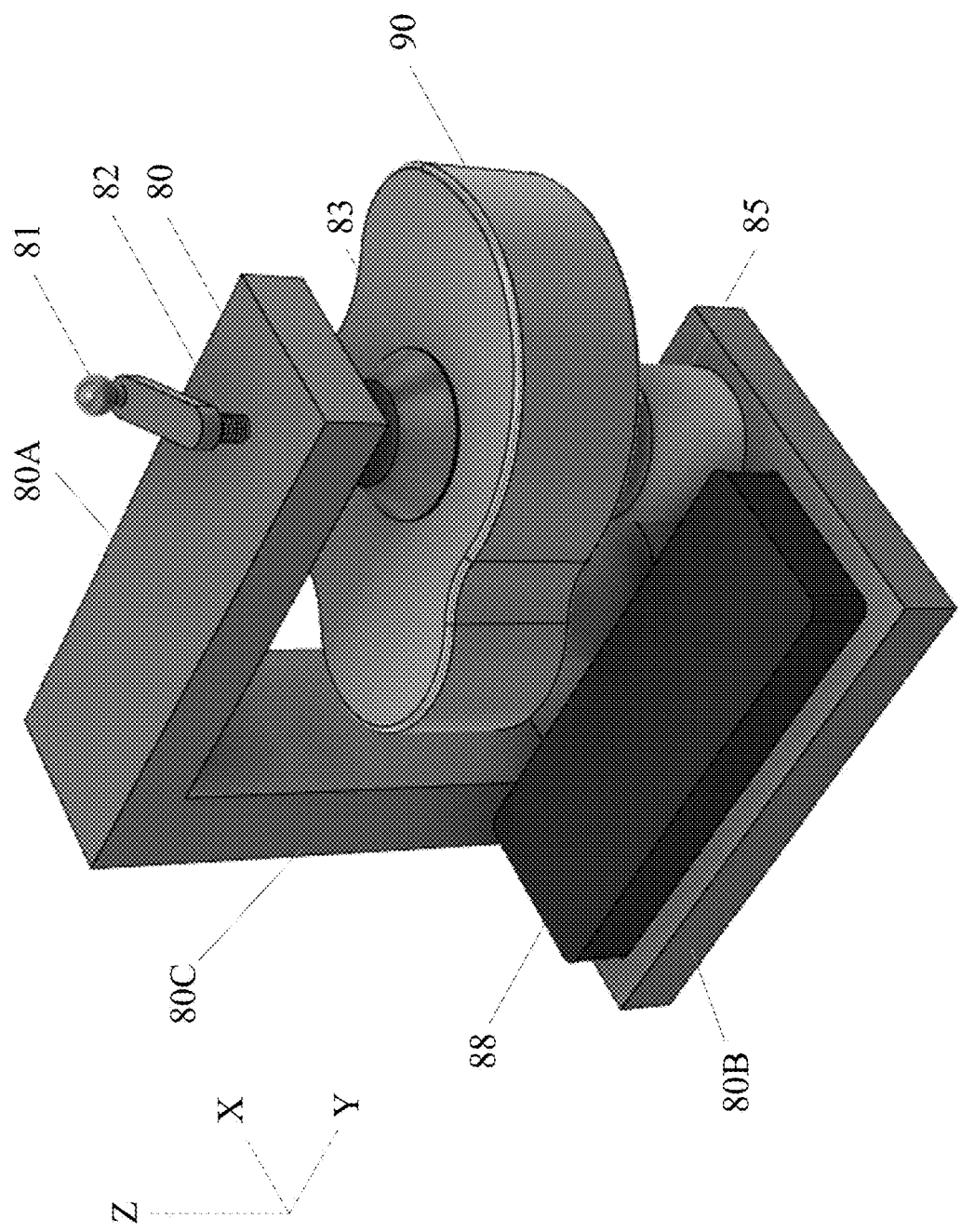
FIG. 9 shows the machine 8 with a sample loaded into place.
Figure 10:
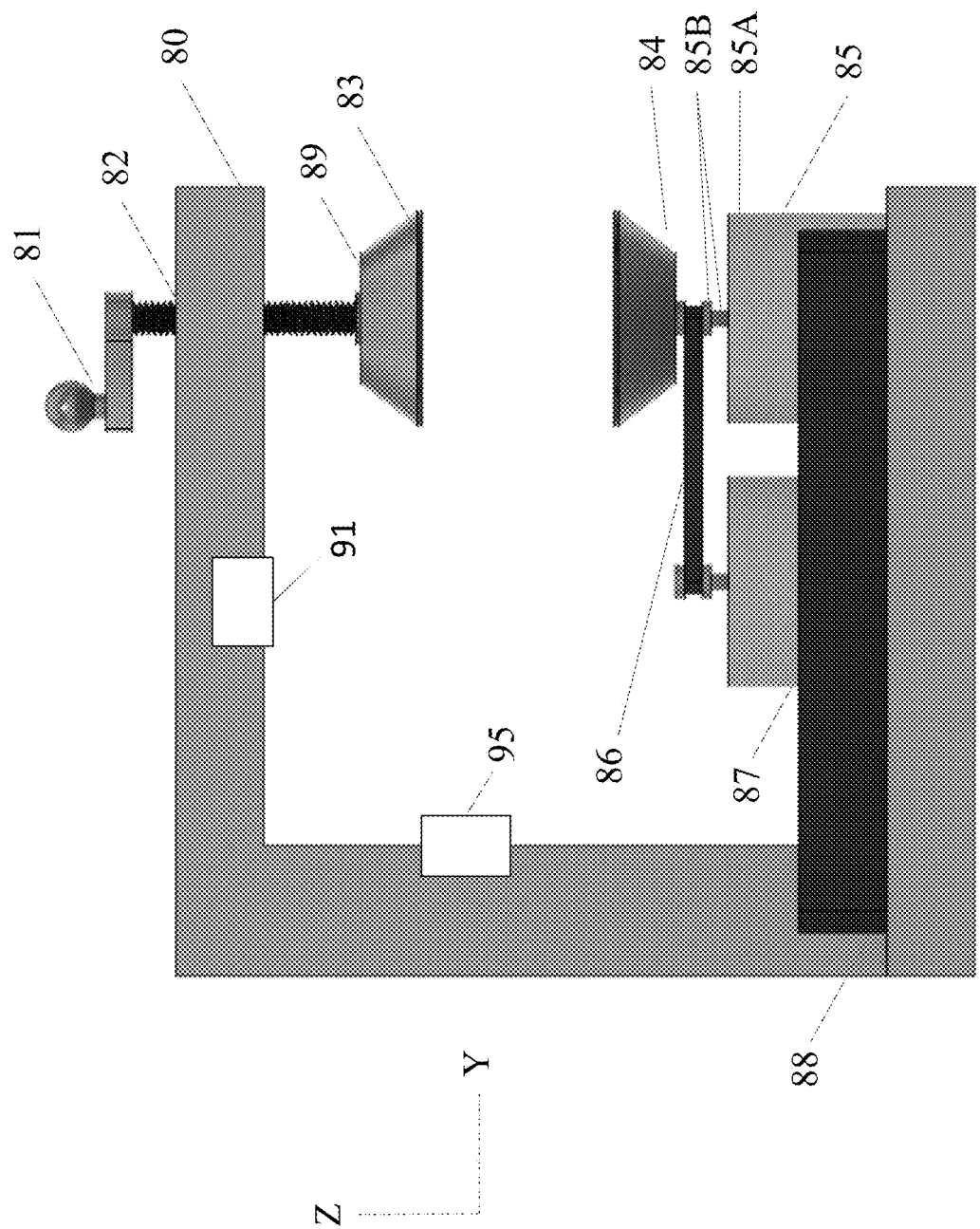
FIG. 10 shows a lateral view of the machine 8.
Figure 11:
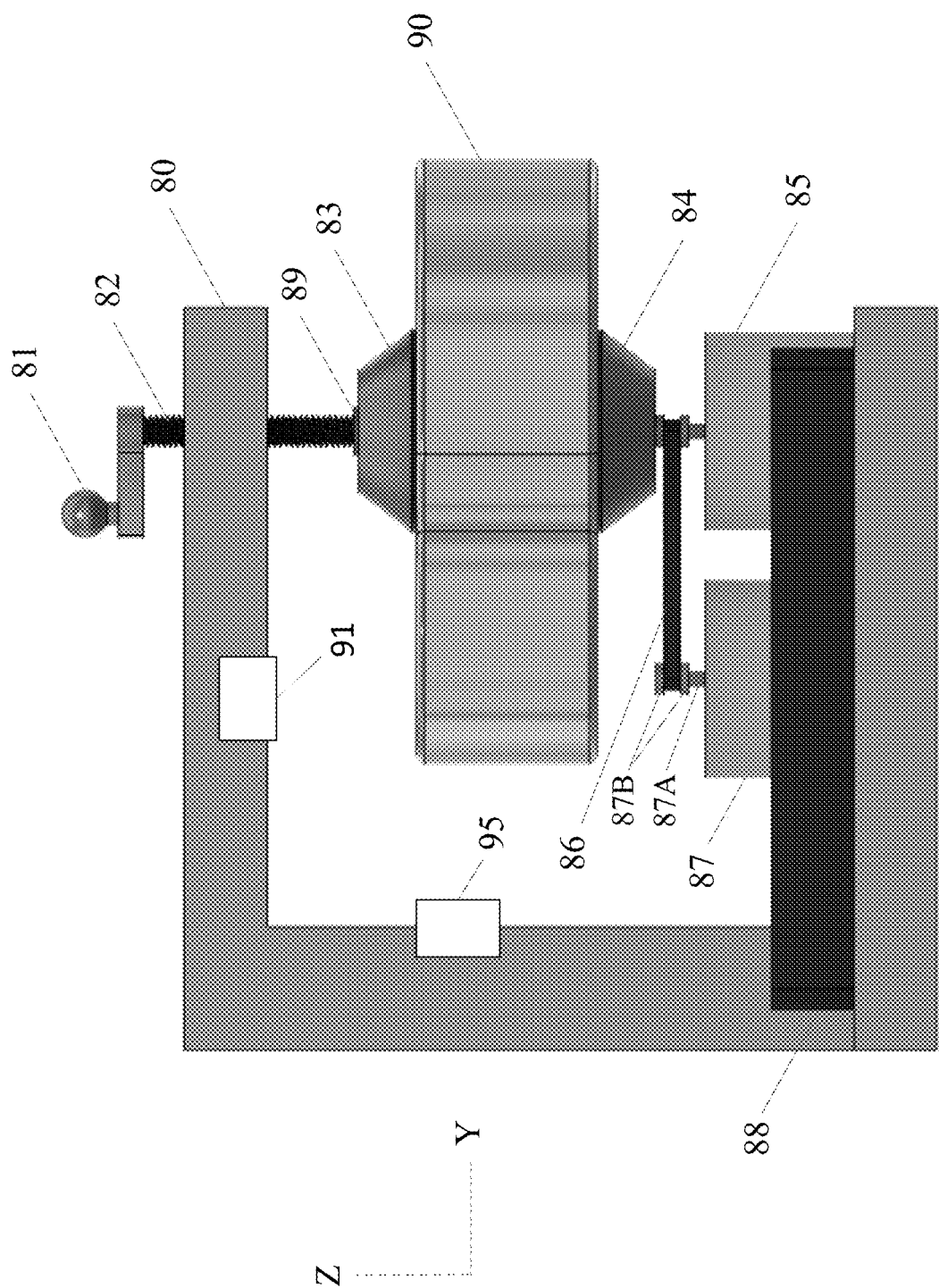
FIG. 11 shows a lateral view of the machine 8 with a sample loaded into place.

FIGS. 8-11 show an apparatus 80 (e.g., machine) for rotating a test object about one axis at a time and for estimating the internal density distribution of the object. FIGS. 8-9 show the apparatus at an oblique overhead angle, and FIGS. 10-11 show a lateral view of the apparatus.

FIGS. 9 and 11 show the apparatus with an test object 90 mounted thereon between two clamps. In this apparatus, the test object 90 can have any geometry, so long as its dimensions fit within the frame 80 of the apparatus.

The frame of the machine 80 provides support for the apparatus and does not move (i.e., the frame remains in a fixed position). A test object 90 is held in place by a pair of mechanical clamps 83 and 84. The upper clamp 83 can be tightened or loosened via the crank 81, which drives a shaft 82 that is threaded through the frame 80 (i.e., the frame 80 can include a threaded hole for receiving the threaded shaft 82, such that the shaft 82 is engaged via threads with the frame 80). The upper clamp 83 rotates freely about the shaft 82 via the bearing 89. The motor 85 drives the angular acceleration of the test object 90 through the lower clamp 84. That is, the motor 85 has an output shaft 85A directly connected to the lower clamp 84 to rotate the lower clamp, which causes the clamped test object 90 to rotate. As illustrated in FIGS. 10 and 11, the output shaft 85A includes two protrusions 85B, which encompass a connection means (e.g., belt 86), and the belt 86 drives a rotary encoder 87. That is, the rotary encoder 87 is mechanically connected to the motor 85 via the belt 86. The output shaft 85A of the motor 85 can have a first diameter, and each of the two protrusions 85B can have a second diameter larger than the first diameter of the output shaft 85A so as to radially protrude from the portion(s) of the output shaft 85A having the first diameter. The rotary encoder 87 has an output shaft 87A having a first diameter, and the output shaft 87A includes two protrusions 87B having a second diameter larger than the first diameter, such that the two protrusions 87B radially protrude from portion(s) of the output shaft 87A having the first diameter. This arrangement of the output shaft 87A of the rotary encoder 87 permits the belt 86 to be encompassed by the respective two protrusions 87B.

The crank 81 can be substituted by any known type of actuator, such as a hydraulic actuator, a pneumatic actuator, an electrical actuator and the like.

For greater dynamic control, the belt within this apparatus can be substituted for a chain, provided the appropriate sprockets are affixed to both the driving and driven shafts. Alternatively, the belt can be substituted for a cable, gears, levers, wheels, shafts, hydraulics, or pneumatics, so long as the motor shaft is dynamically linked to the shaft of the rotary encoder.

The frame 80 can include base portion 80A, a top portion 80B, and a connection portion 80C connecting the base portion 80B to the top portion 80A. Further, the motor 85 can be connected to the base portion 80B in any known manner, including by fastening, welding, soldering, or the like. Further, the shaft 82 can be threaded through the top portion 80A of the frame 80. The base portion 80B, the top portion 80A and the connection portion 80C may be integrally formed, such that they constitute a single unitary member.

The rotary encoder 87 may be as known in the art, which is also referred to as a shaft encoder, and is an electro-mechanical device that converts the angular position or motion of a shaft or axle to analog or digital output signals. There are two main types of rotary encoder: absolute and incremental. According to an embodiment of the present invention, as shown in FIGS. 8-11, the rotary encoder 87 measures the angular position and/or motion of the shaft 82.

The box 88 represents the controller (i.e., hardware-embedded processor, which is described in further detail below), computer, circuitry, electronic sensors, and power supply for the machine, including the electrical circuit shown in FIG. 13.

Figure 13:
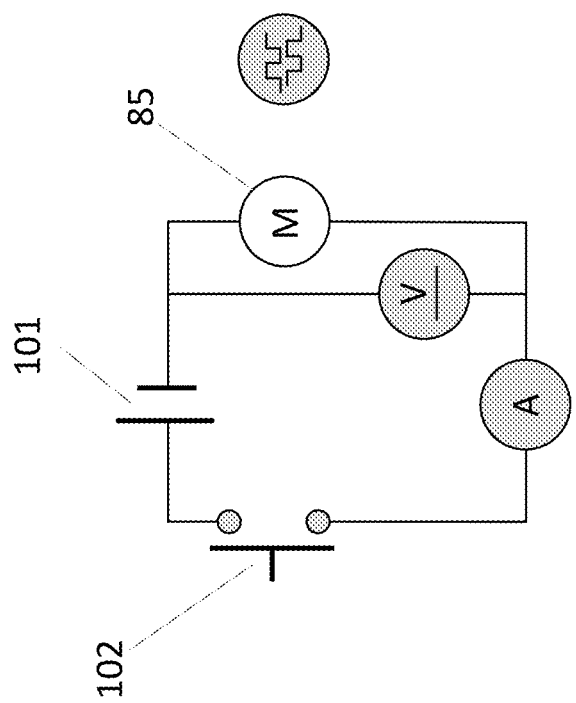
FIG. 13 is an example of a more complex use-case for the present invention, where a machine measures internal density through many different axes.

According to FIG. 13, the motor 85 is powered by a power source 101 and controlled via a switch 102. The power source 101 may be any type of DC power source, such as a battery (e.g., secondary battery), a capacitor, or alternatively may be an AC power source, such as a 120V or 220V, which may originate from an electric utility distribution. The motor 85 is directly connected to a voltmeter V, which measures the voltage output of the motor 85, and ammeter A, which measures the amperage output of the motor 85, and therefore the power use of the motor 85.

The switch 102, ammeter A, voltmeter B, and rotary encoder 87 are connected to the box 88, and box 88 can include a computer comprising a controller and non-transitory computer readable medium (i.e., memory).

The rotary encoder 87 can be substituted by any known device which can measure angular position or angular velocity, such as a tachometer, rotary motion sensor and the like.

In order to improve the estimation of the mass distribution and/or mass density of the test object, the test object will be unclamped, moved to a different position and re-clamped, in order to rotate the object about different axes. This process will be repeated a predetermined number of times, and the number of times may be any positive number. This apparatus will output a 2-D map of the density distribution of the object on a display device (e.g., a display screen, a mobile terminal or the like).

For this use-case, the machine cannot detect the external geometry of the sample, and it must be measured through external means (or provided via a model or shape boundary). However one or more light sensors (e.g., cameras or infra-red (IR) laser arrays or the like) can be installed at locations 91 and 95 to incorporate the measurement into the operation of the machine. Multiple measurements by the light sensors can be compiled into a 2D or 3D shape file using software. The light sensors would be connected to the box 88, and box 88 can include a computer comprising a controller and non-transitory computer readable medium (i.e., memory).

Figure 12:
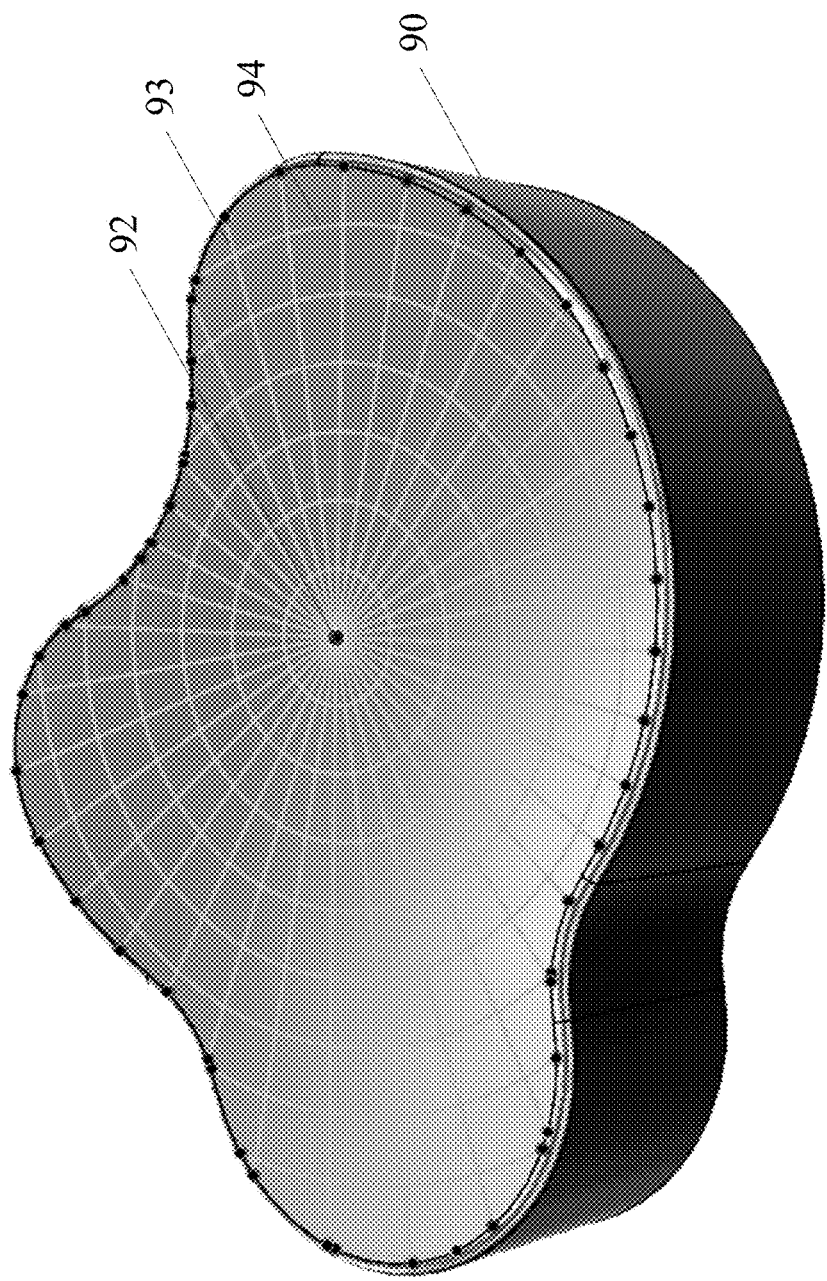
FIG. 12 shows the basic electronic circuitry of the machine 8.

FIG. 12 shows a graphic representation of how software could calculate the reference MOI of a test object by using the shape boundary and a numerical sum of the equation $MOI_{ref}=\rho_{ref}*\Sigma(L_i*r_i^2)$. The equation calculates the reference MOI as a sum of the mass multiplied by the square of an arbitrary radius r 93 away from the axis of rotation 92 over an arbitrary number of iterations i 94.

If an object has two opposite parallel surfaces with perpendicular sides (e.g. a flat plate or bar stock), calculating a reference MOI is relatively easy. Test objects with more complex 3D geometry require more information about the shape boundary as it varies along the Z axis. For more complex geometry, the software will need to omit volume from the reference MOI calculation wherever the test object is not flat. For example, if the test object is a sphere, the software must omit the empty volume between the sphere and a cylinder of equivalent radius. Otherwise, the reference MOI will be inaccurate.

Provided a simple model or shape file of the test object, software can be used to quickly draw an arbitrary number of concentric shells around the axis of rotation at arbitrary radii away from the axis of rotation. If a portion of the shell is outside of the test object, that portion of the volume of the respective shell is omitted from the calculation.

To use this machine, a user would have to weigh the test object, then calibrate the machine by driving the motor 85 without a loaded sample, then load the test object into the clamps 83, 84, provide the machine with the reference MOI (as calculated above) and activate the motor 85, which will induce an angular acceleration and torque on the test object. During rotation of the object about the first axis, the motor 85 applies a torque to the object and an angular acceleration of the object is determined by the rotary encoder 87. The motor 85 can be provided with a sensor to measure the torque applied to the object, including such as an in-line torque transducer.

The computer will then provide the calculated density through the axis of rotation based on the dynamic response of the sample as shown in FIG. 2.

The present invention is useful for quickly detecting voids and inclusions within simple parts. Further, the apparatus of the present invention can be used in the fields of metallurgy and precision manufacturing.

Multi-Axis Use-Case (FIGS. 14-24)

Figure 14:
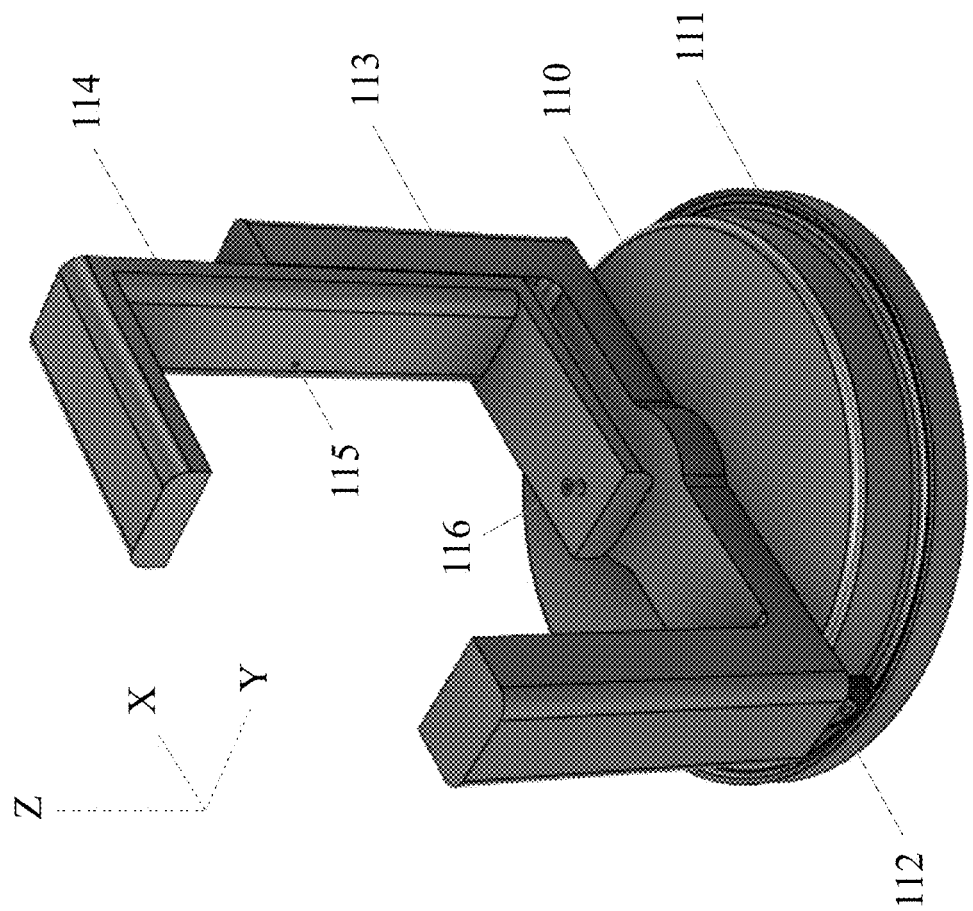
FIG. 14 shows the machine 13 with a sample loaded into place.
Figure 15:
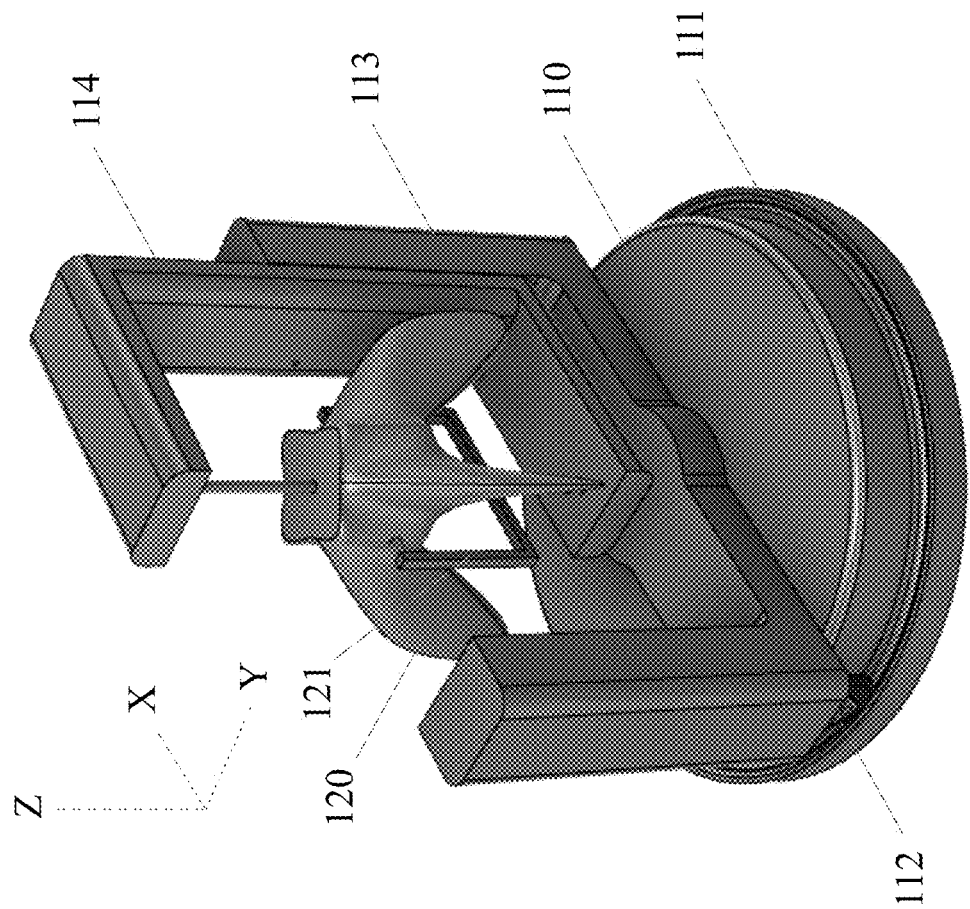
FIG. 15 shows a lateral view of the machine 13.
Figure 16:
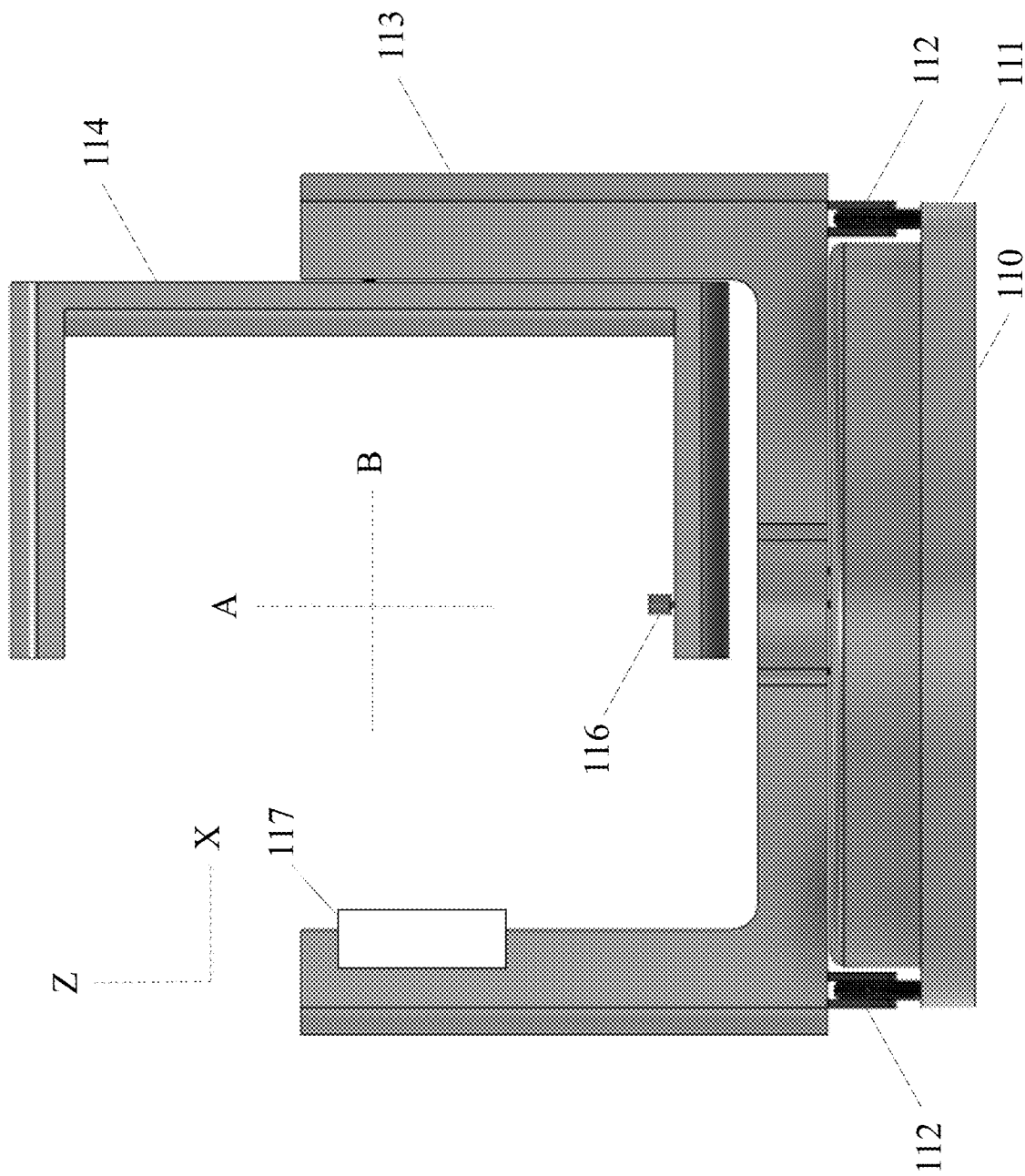
FIG. 16 shows a lateral view of the machine 13 with a sample loaded into place.
Figure 17:
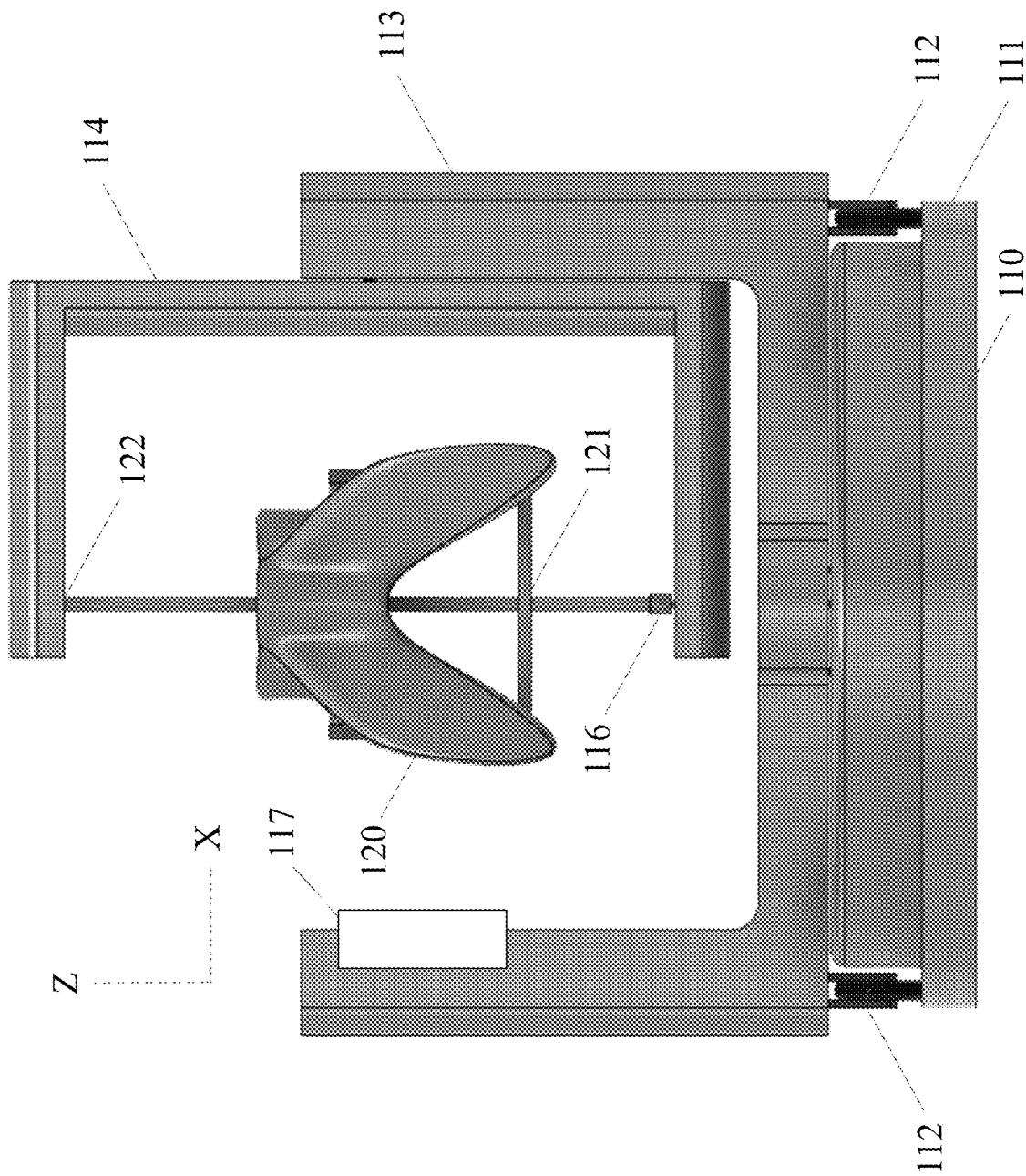
FIG. 17 is a transparent view of the machine 13 that highlights the location of the more detailed FIGS. 18-22.
Figure 18:
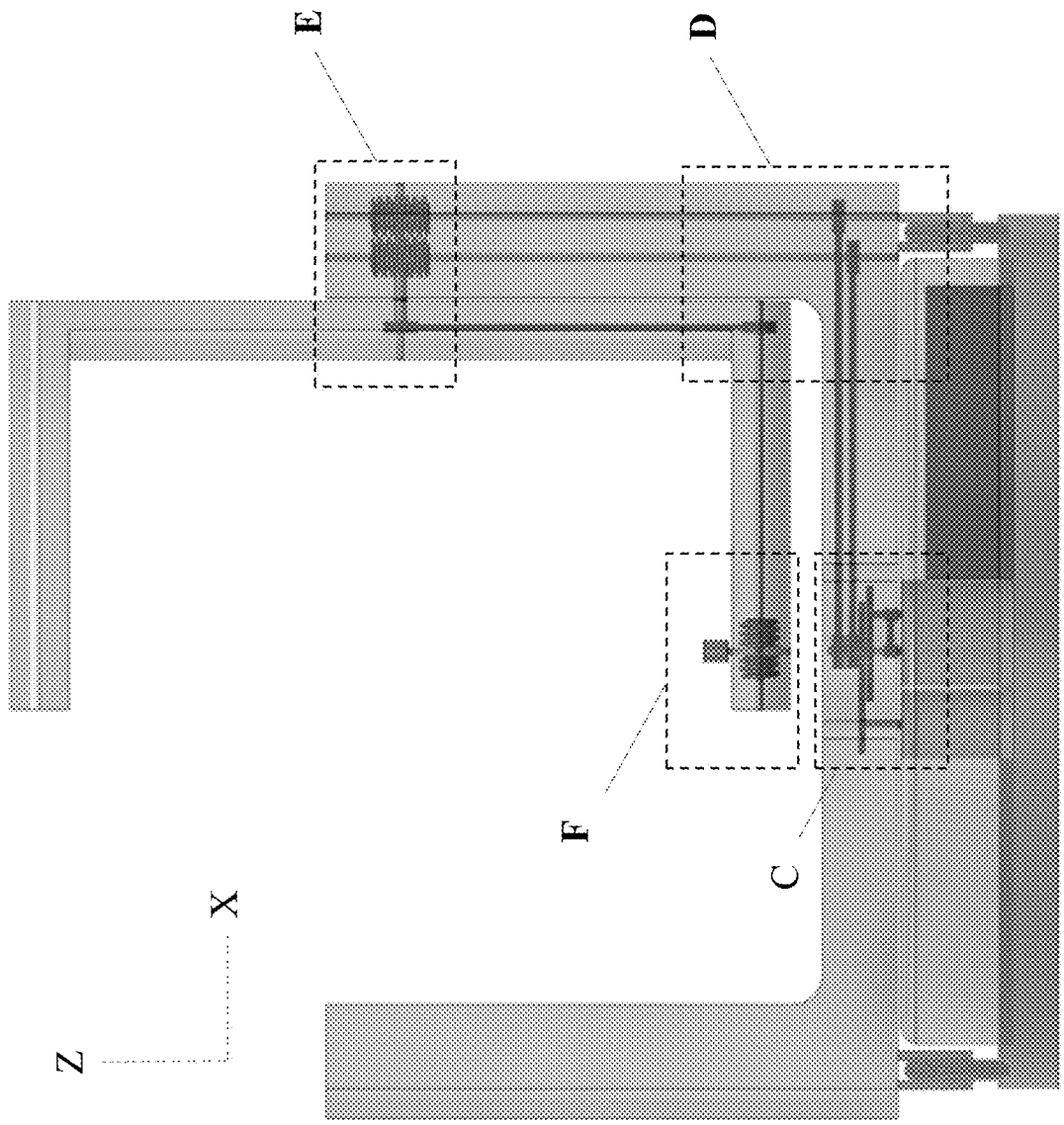
FIG. 18 is a cross-section of the machine 13 that shows detail of the central gearbox.

FIGS. 14-23 show an apparatus for rotating a test object about many axes (i.e., a plurality of axes) and for estimating the internal density distribution of the object (i.e., test object). FIGS. 14-15 show the apparatus at an oblique overhead angle, and FIGS. 16-18 show a lateral view of the apparatus. FIGS. 19-23 provide more detail with various cross-section views of the apparatus.

FIGS. 15 and 17 illustrate an apparatus holding a test object 120 mounted via a fixture 121. The fixture 121 is connected to the machine (i.e., connected to the outer shell 113 of the machine) via a fitting 116 and a bearing 122 (shown in FIG. 17, and can be designated as a "fixture bearing"). In this apparatus, the test object 120 can have any geometry, so long as its dimensions fit within the inner shell 114 of the apparatus. The fixture 121 can be custom-made to hold a specific test object, as shown, or it can be made more universal to hold many different test objects with various geometries.

The apparatus includes an outer shell 113, an inner shell 114, a base 110, a track 111, bearings 112 disposed on the track 111 and a fixture 121.

The base 110 of the machine provides support for the machine and does not move (e.g., remains substantially fixed during operation of the machine). A track 111 is built (e.g., disposed) around the base 110 to support a pair of bearings 112, here shown as a pair of wheels. The bearings 112 allow an outer shell 113 to rotate freely about the base 110. The bearings 112 can be attached to the outer shell 113 by any known means, including using fasteners, welding, brazing, soldering or the like.

Figure 19:
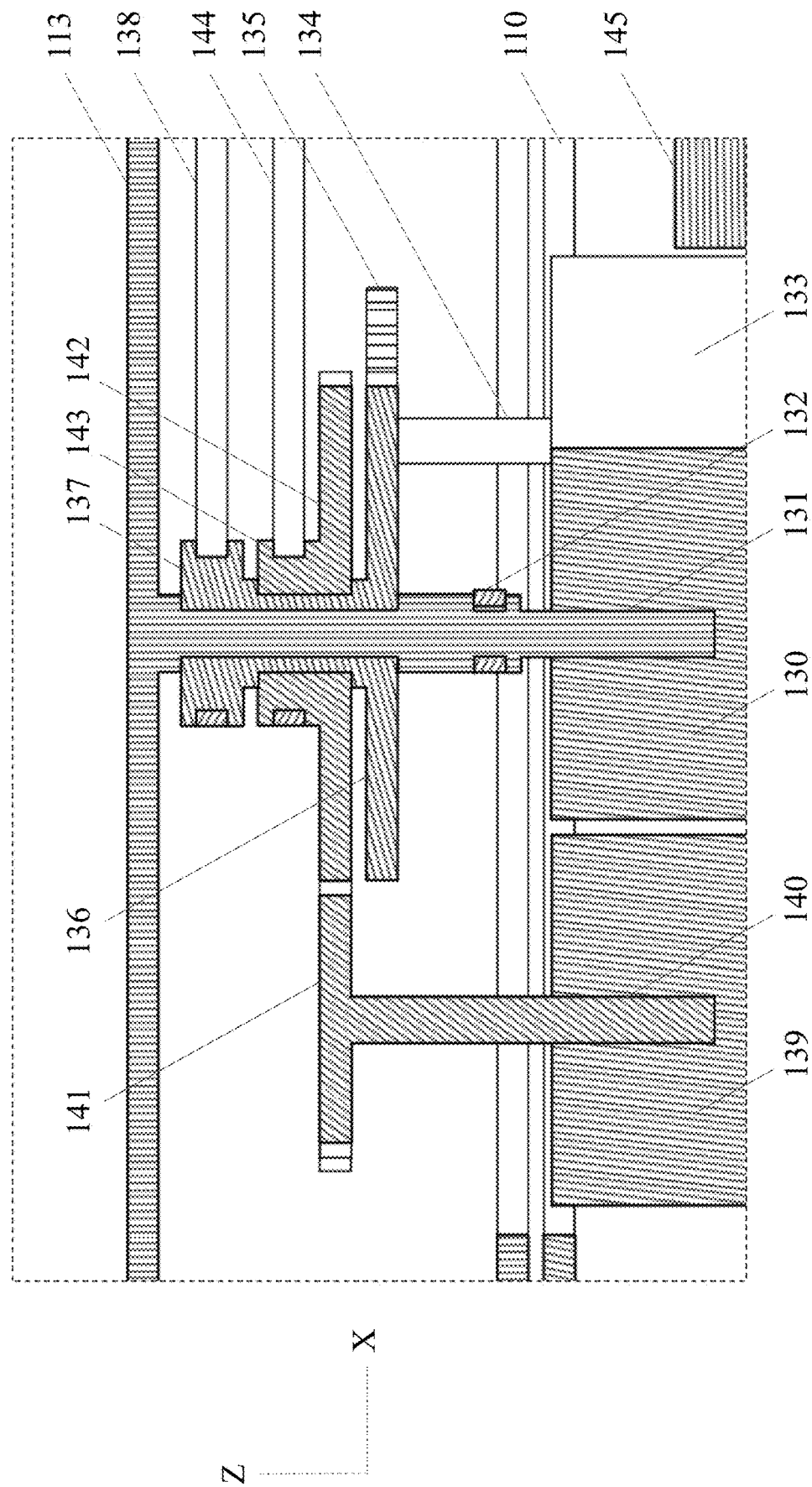
FIG. 19 is a top-down view of the gearbox as in 18.
Figure 22:
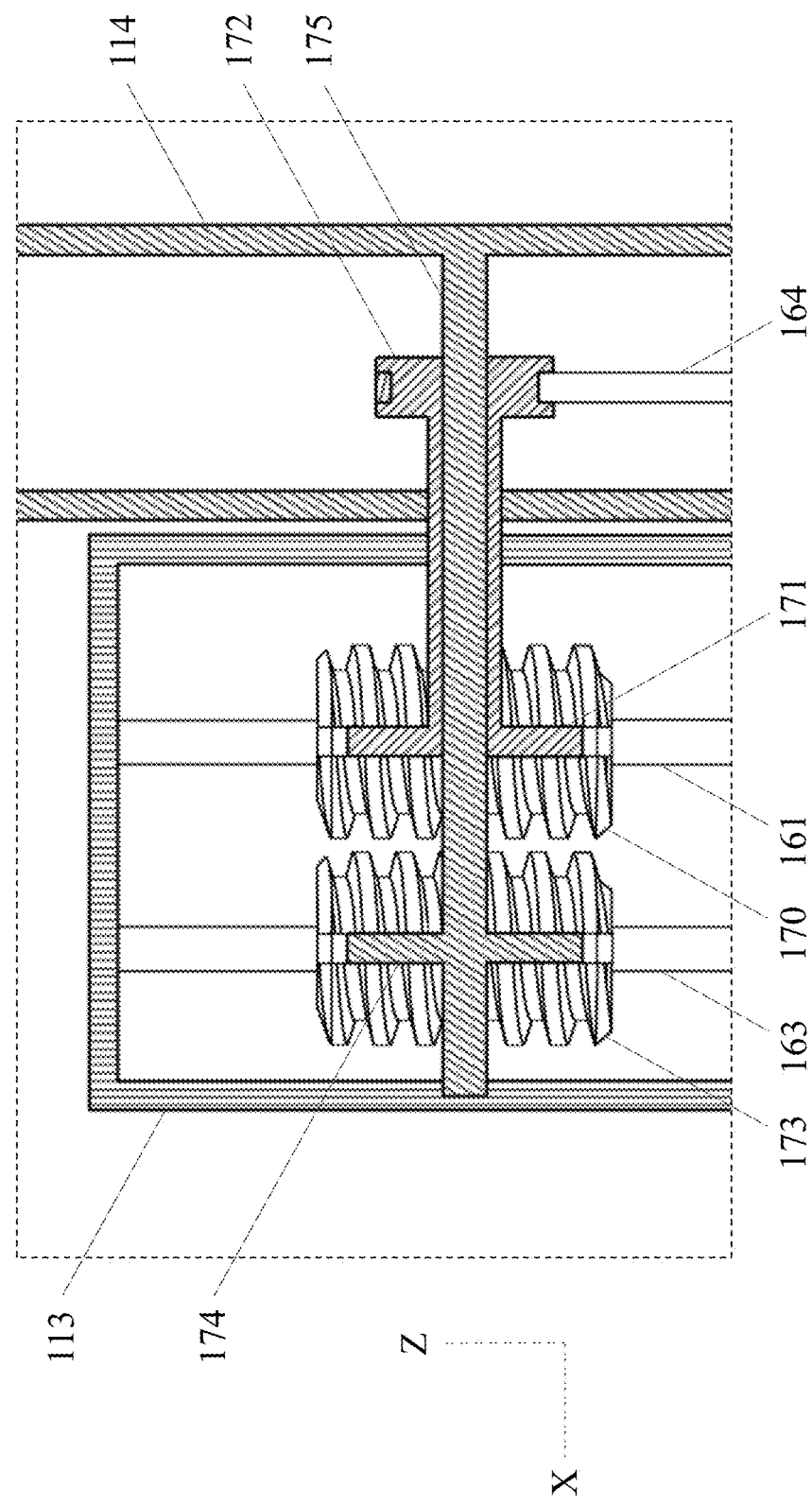
FIGS. 22 and 23 are cross-sections of the machine 13 that shows detail of the gear system that transfers motion from the inner shell to the sample.

Axis A is parallel to a vertical axis Z and is coaxial with a center of a shaft 131 (shaft 131 is shown in FIG. 19). Axis A defines an axis of rotation of the outer shell 113, and is the axis where MOI is measured by the machine. Axis B is perpendicular to axis A and is coaxial with the center of the shaft 175 (shaft 175 is shown in FIG. 22). Axis B defines the axis of rotation of an inner shell 114. Axis B is offset from axis A such that the two axes do not intersect. The label 115 shows the offset location of shaft 175 within the inner shell.

FIG. 19 is a cross-section view of the internal mechanisms around the main motor assembly. The cross-section in FIG. 19 is parallel to the plane XZ, coplanar with axis A, at location C shown in FIG. 18.

Figure 20:
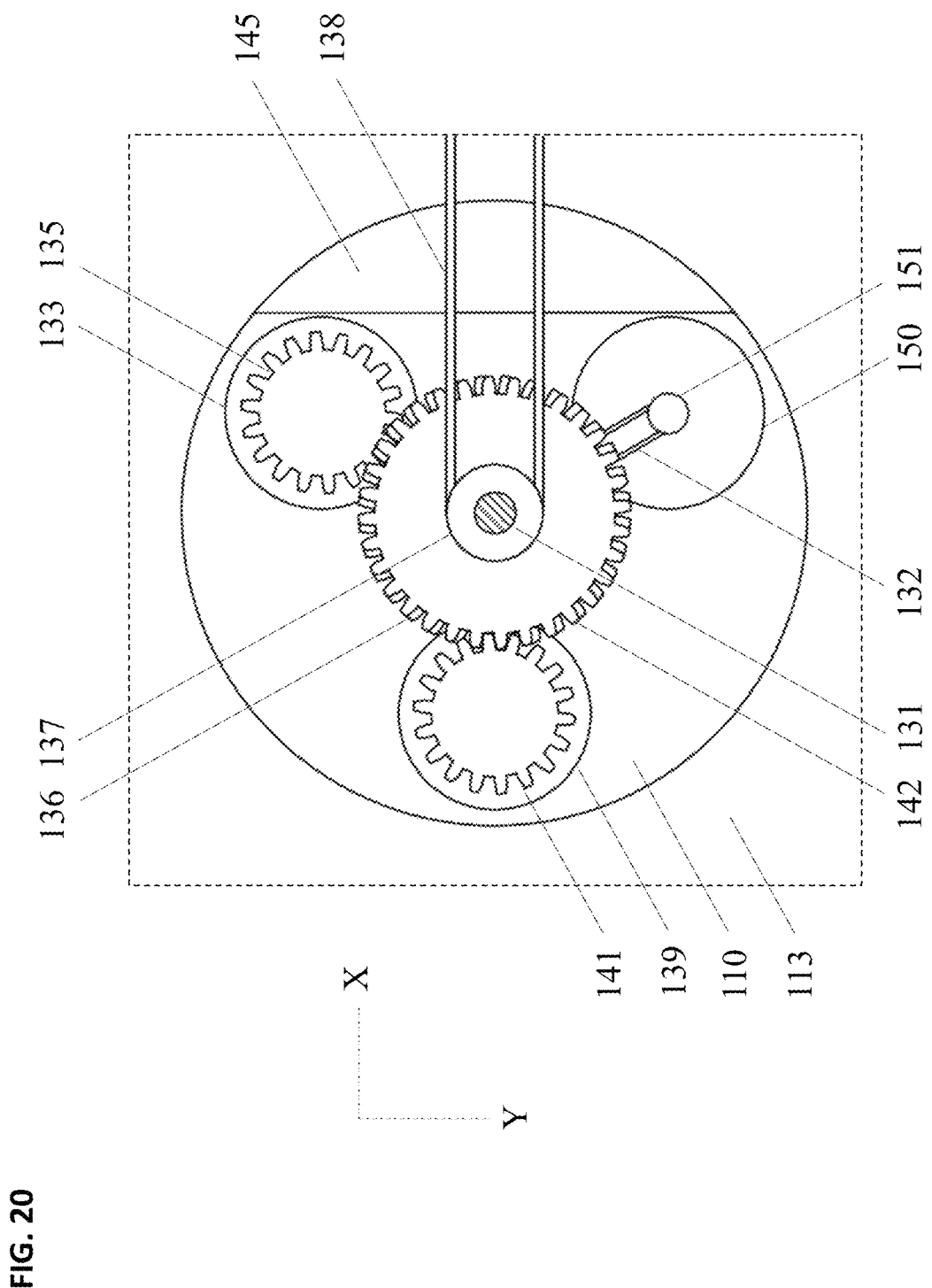
FIG. 20 is a cross-section of the machine 13 that shows detail of the connection system.

FIG. 20 is a cross-section view of the internal mechanisms around the main motor assembly. The cross-section in FIG. 20 is parallel to the plane XY, just before axis 131 joins to the outer shell 113, and shows the same mechanisms as FIG. 19.

Figure 21:
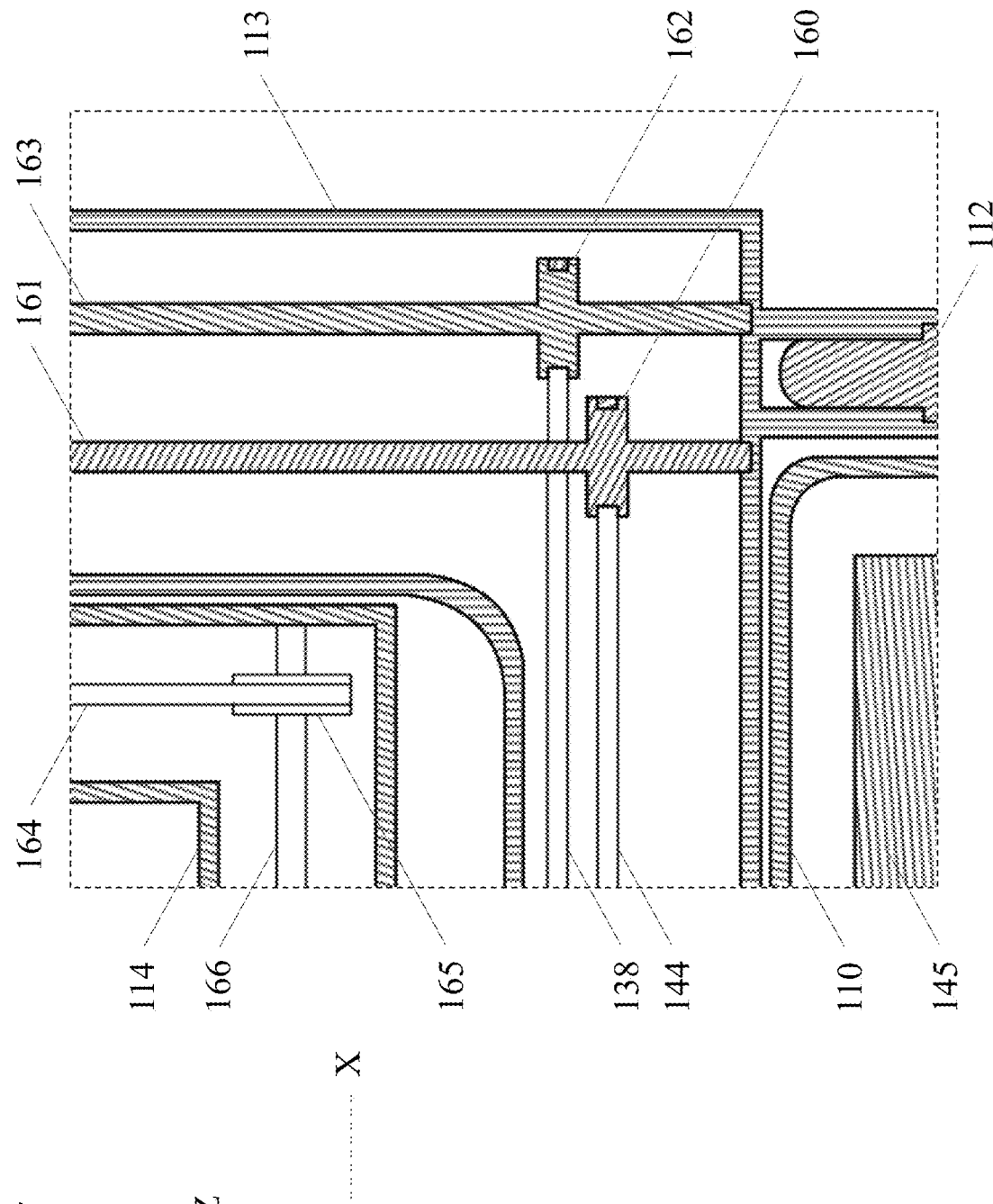
FIG. 21 is a cross-section of the machine 13 that shows detail of the gear system that transfers motion from the outer shell to the inner shell.

FIG. 21 is a cross-section view of the internal mechanisms within the outer shell 113 and the inner shell 114. The cross-section in FIG. 21 is parallel to the plane XZ, coplanar with axis A, at location D shown in FIG. 18.

FIG. 22 is a cross-section view of the internal mechanisms between the outer shell 113 and the inner shell 114. The cross-section in FIG. 22 is parallel to the plane XZ, coplanar with axis B, at location E shown in FIG. 18. Please note that the view in FIG. 22 is inverted across the XZ plane relative to FIGS. 19, 21, and 23.

Figure 23:
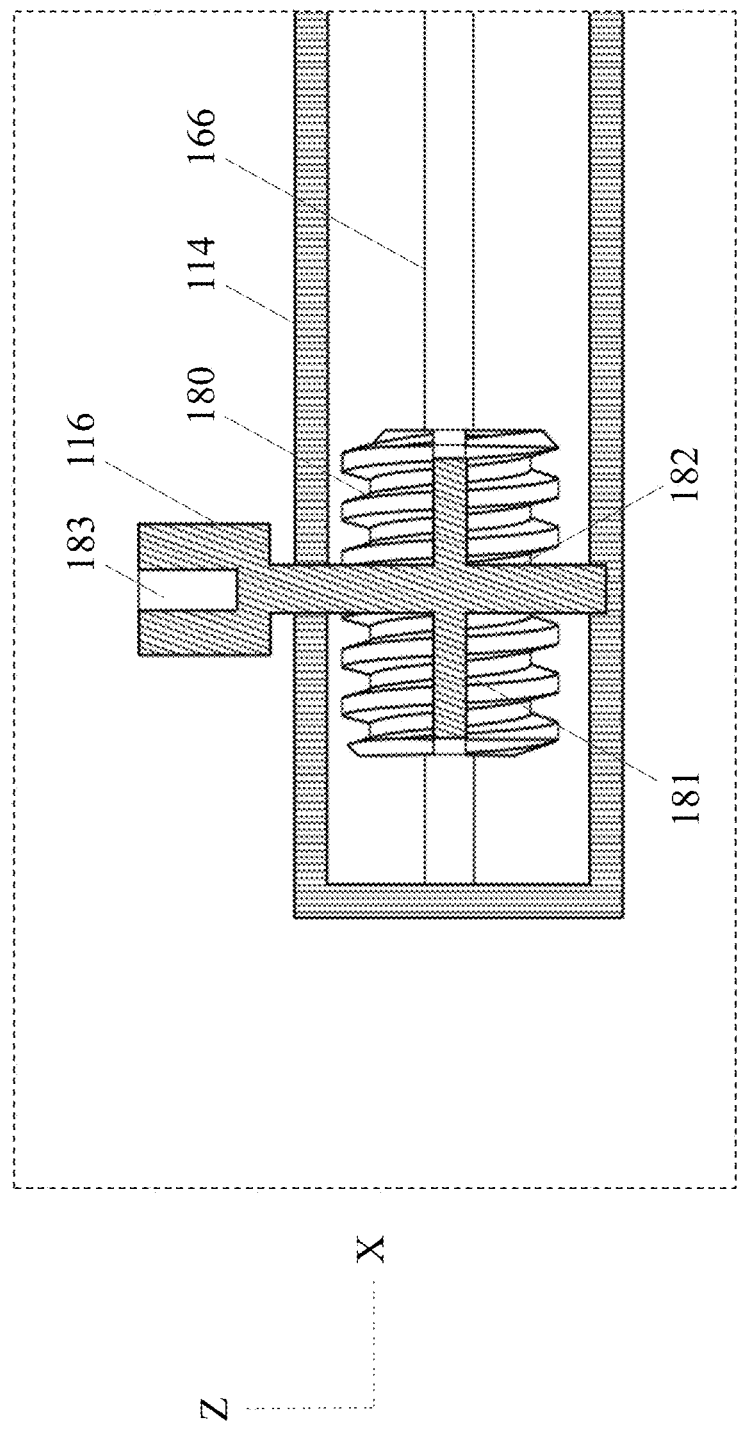

FIG. 23 is a cross-section view of the internal mechanisms within the inner shell 114. The cross-section in FIG. 23 is parallel to the plane XZ, coplanar with the center of the fitting 116, at location F shown in FIG. 18.

The motor 130 drives a shaft 131, which drives rotation of the outer shell 113 about axis A. As the motor 130 drives rotation of the outer shell 113, it will induce an angular acceleration on the test object 120, since the inner shell 114 is locked in place relative to the outer shell 113. A rotary encoder 150 is mechanically connected to the motor 130 via the shaft 131, the chain 132, and the sprocket 151.

The motor 133 (i.e., second motor 133) drives a shaft 134, the shaft 134 drives a pinion 135, the pinion 135 drives a gear 136, the gear 136 drives a pulley 137, the sprocket 137 drives a chain 138, the chain 138 drives a sprocket 162, the sprocket 162 drives a shaft 163, the shaft 163 drives a worm gear 173, the worm gear 173 drives a pinion 174, the pinion 174 drives a shaft 175, and the shaft 175 drives the rotation of the inner shell 114 about axis B. As the motor 133 drives rotation of the inner shell 114, it proportionally rotates the test object relative to axis A, which allows the machine to precisely control the axis of rotation where the next MOI measurement will be made.

A motor 139 (i.e., third motor 139) drives a shaft 140, the shaft 140 drives a pinion 141, the pinion 141 drives a gear 142, the gear 142 drives a sprocket 143, the sprocket 143 drives a chain 144, the chain 144 drives a sprocket 160, the sprocket 160 drives a shaft 161, the shaft 161 drives a worm gear 170, the worm gear 170 drives a pinion 171, the pinion 171 drives a sprocket 172, the sprocket 172 drives a chain 164, the chain 164 drives a sprocket 165, the sprocket 165 drives a shaft 166, the shaft 166 drives a worm gear 180, the worm gear 180 drives the pinion 181, the pinion 181 drives the shaft 182, and the shaft 182 drives the fitting 116. The fixture 121 can be loaded into fitting 116 via threading 183. When the fixture 121 is loaded into the fitting 116, the rotation of the fitting 116 drives the rotation of the test object 120 through the fixture 121. As the motor 139 drives rotation of the fitting 116, it proportionally rotates the test object 120 relative to axis A, which allows the machine to precisely control the axis of rotation where the next MOI measurement will be made.

Motors 133 and 139 work in concert to rotate the test object 120 to virtually any orientation relative to axis A to provide full coverage for MOI measurements.

The gears 136 and 142 and the pulleys 137 and 143 must be concentric about the shaft 131 because otherwise the belts 138 and 144 would collide with the shaft 131 when the outer shell 113 is rotated.

The pulley 137 must be positioned above the pulley 143 because otherwise the belt 138 would collide with the shaft 140 when the outer shell 113 is rotated.

Each of the chains within this apparatus can be substituted for belts, cables, gears, levers, wheels, shafts, hydraulics, or pneumatics, so long as the appropriate driving and driven mechanisms are dynamically linked.

The pinion 171 and the pulley 172 must be concentric about the shaft 175 because the inner shell 114 rotates about axis B with respect to the outer shell 113, so axis B is the only fixed location where mechanical motion can be efficiently transferred from the outer shell 113 to the inner shell 114.

The motors 133 and 139 must be driven alongside motor 130 to prevent relative motion between the pulleys 160 and 162 and the shaft 131 whenever the motor 130 is in operation. Otherwise, unwanted changes to the test axis A can occur.

Figure 24:
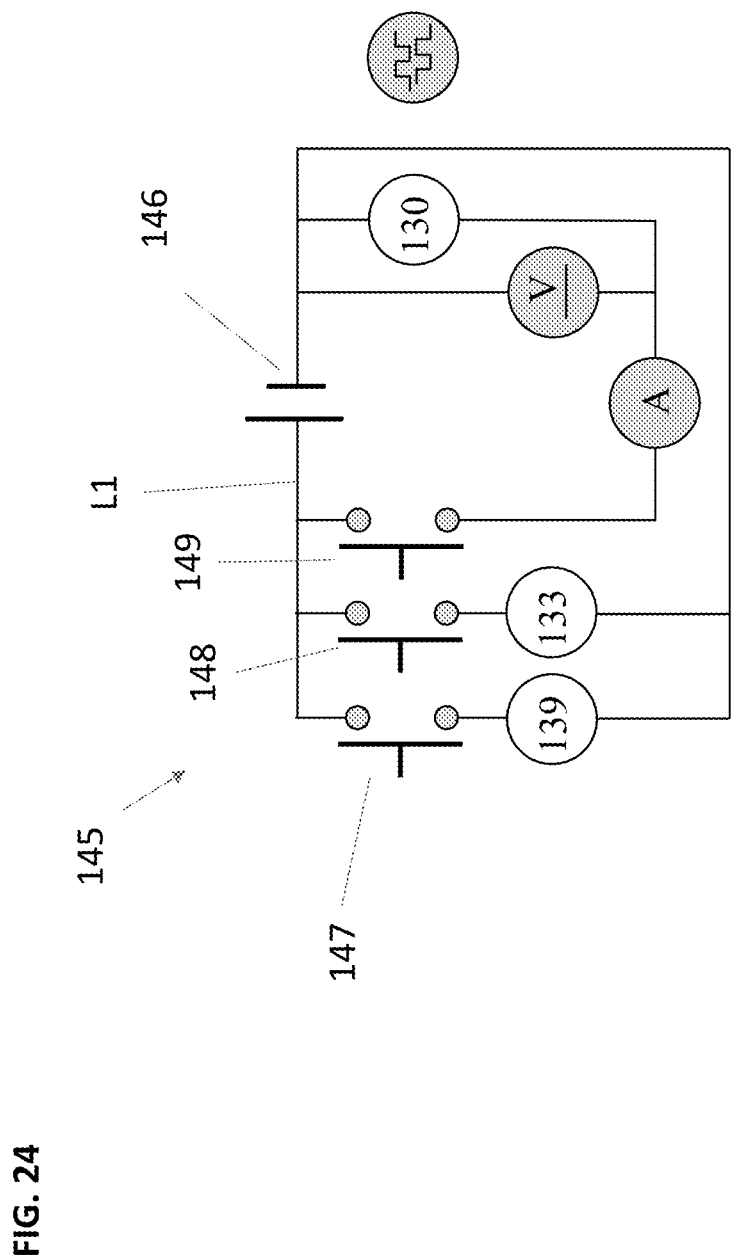
FIG. 24 shows the basic electronic circuitry of the machine 13.

The box 145 represents the controller, computer, circuitry, electronic sensors, and power supply for the machine, including the electrical circuit shown in FIG. 24.

According to FIG. 24, the motors 130, 133, and 139 are powered by a power source 146 (in the same manner as set forth above) and controlled via three independent switches 147, 148 and 149. The motor 130 is directly connected to a voltmeter and ammeter, which monitor the power use of the motor. The switches 147, 148 and 149 are connected, via line L1, between the power source 146 (e.g., battery, etc.) and the motors 130, 133, and 139. A voltmeter V is connected in parallel to the motor 130, and an ammeter A is connected in series to the motor 130 between the motor 130 and the switch 149.

The switches 147, 148 and 149, ammeter A, voltmeter V, and rotary encoder 150 are connected to box 145 and box 145 can include a computer comprising a controller and non-transitory computer readable medium (i.e., memory). The switches can be actuated by either an operator or software.

The rotary encoder 150 can be substituted by any known device which can measure angular position or angular velocity, such as a tachometer, rotary motion sensor and the like.

Like the machine in FIGS. 8-11, the present machine cannot detect the external geometry of the sample, and it must be measured through external means (or provided via a model). However, a light sensor (such as a camera or IR laser array or the like) can be installed at location 117 to incorporate the measurement into the operation of the machine. Multiple measurements by the light sensor can be compiled into a 2D or 3D shape file using software. The light sensor would be connected to the box 145, and box 145 can include a computer comprising a controller and non-transitory computer readable medium (e.g., memory).

To use this machine, an operator would have to weigh the object and fixture, then calibrate the machine by driving the motor without a loaded test object and fixture, load a test object and fixture into the clamps, then provide the machine with information about the geometry of the test object and fixture via a model or shape file, then activate motors 133 and 139 as needed to position the sample (both of which can be automated), then activate motor 130, which will induce an angular acceleration and torque on the sample.

The computer will then provide the calculated density through the axis of rotation based on the dynamic response of the sample as shown in FIG. 2.

The use-case presented here would be useful for fully mapping the internal structure of complex parts. This machine would be useful in the fields of Metallurgy, Precision Manufacturing, Reverse Engineering, Geology, and Paleontology.

Declaration of Variables $MOI_{ref}$ is the reference moment-of-inertia, $MOI_{meas}$ is the measured moment-of-inertia, $\rho_{ref}$ is the reference density of the object, $\rho_{est}$ is the estimated density of the object, m is the mass, r is the radius, L is the volume, P is the power, I is the current, V is the voltage, $\tau$ is the torque, $\alpha$ is the angular acceleration, $\omega$ is the angular velocity, $\theta$ is the angular position, t is time, i represents an arbitrary number of iterations and $\Delta$ represents the change (in the particular variable). For instance, $\Delta\theta$ represents the change in angular position and $\theta t$ represents the change in time.

| Equations | | |
|---|---|---|
| numerical geometric solution for MOI | $MOI_{ref} = \rho_{ref} * \Sigma(L_i * r_i^2)$ | EQN. 1 |
| mass-density | $\rho_{ref} = m/L$ | EQN. 2 |
| Newton's Second Law (angular) | $\tau = \alpha * MOI_{meas}$ | EQN. 3 |
| torque-power | $\tau = P/(2\pi * \omega)$ | EQN. 4 |
| Ohm's Law | $P = I * V$ | EQN. 5 |
| kinematics (angular velocity) | $\omega = \Delta\theta/\Delta t$ | EQN. 6 |
| kinematics (angular acceleration) | $\alpha = \Delta^2\theta/\Delta t^2$ | EQN. 7 |
| estimated average density | $\rho_{est} = \rho_{ref} * (MOI_{ref}/MOI_{meas})$ | EQN. 8 |

Operation

The foundational principle of this method is the angular form of Newton's Second Law (EQN. 3), which states that torque is equal to the product of angular acceleration and moment of inertia (MOI). More torque is required to accelerate a larger MOI than a smaller MOI, so a higher MOI implies either a larger overall mass or mass distributed farther from the axis of rotation.

MOI is a cumulative measurement of mass distribution, so it can be solved analytically if the geometry and density distribution is known. However, if the density distribution is not known (as is the case with the present method), a reference MOI can be solved numerically by EQN. 1 provided the density is assumed constant.

Comparing the results of the reference MOI and measured MOI provides information about the one-dimensional density through the axis of rotation proportional to the total mass distribution. Thus, the present method can be used to determine the density distribution within an object if it is not known.

Mass distribution can be approximated by weighing the object, calculating the volume of the object, calculating the reference density by EQN. 2, calculating a reference MOI assuming a constant density by EQN. 1, experimentally measuring the angular acceleration and torque by EQN. 4, EQN. 5, EQN. 6, EQN. 7, or other means, calculating MOI by EQN. 3, and comparing the reference and experimental values of MOI by EQN. 8.

If the reference MOI is higher than the experimental MOI, then the average mass-density along the axis of rotation is higher than the reference mass-density. If the reference MOI is equal to the experimental MOI, then the average mass-density along the axis of rotation is equal to the reference mass-density. If the reference MOI is lower than the experimental MOI, then the average mass-density along the axis of rotation is lower than the reference mass-density. The result of EQN. 8 is the true average mass-density along the axis of rotation. If a three-dimensional mass distribution is desired, the basic operation described above can be repeated many times along many different axes of rotation. The mass distribution may then be compiled into a map or graphic.

All or part of the basic operation described above may be automated by a machine. Uncertainty may be introduced to the mass distribution by the following sources: number and spatial arrangement of measurement axes, precision of measurements, influence from the surrounding environment, such as friction from the atmosphere, and propagated uncertainties.

A greater number of measurements along a greater number of axes will decrease the uncertainty of the measurements.

Thus, the general description for a novel Metrological technique has been disclosed. It should be apparent, however, to those proficient in the field that many adaptations are possible without departing from the inventive concepts herein. The inventive subject matter, therefore, is not to be restricted except in the spirit of the appended claims.

In the above description, the various shafts (e.g., shafts 82, 85A, 87A, 131, 140, 161, 166 and 175) can be designated as first shaft, second shaft, third shaft, fourth shaft, fifth shaft, sixth shaft, seventh shaft, eighth shaft and ninth shaft, or have any other designation. The same is the case with the other components of the apparatus according to the present application. That is, all of the components recited above can have any adverb designation, such as first, second, third, etc.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of measuring a distribution of mass or distribution of density of an object, comprising:
   a. providing an apparatus, the apparatus including:
      a frame;
      a motor connected to the frame;
      a clamp rotatably connected to the motor;
      an angular position sensor or angular velocity sensor connected to the motor and rotation of the motor causes a rotation of the angular position sensor or angular velocity sensor; and
      a hardware-embedded processor electrically connected to the angular position sensor or angular velocity sensor and to the motor;
   b. clamping the object to the apparatus via at least one clamp;
   c. calculating a reference density of the object using Equation 2,
   Equation 2 is as follows:

$$\rho_{ref} = \frac{m}{L},$$

with $\rho_{ref}$ representing a reference density of the object, m representing a mass of the object and L representing a volume of the object;
   d. selecting an axis of rotation;
   e. calculating, via the processor, a reference moment of inertia (MOI) using Equation 1,
   Equation 1 is as follows: $MOI_{ref}=\rho_{ref}*\Sigma(L_i*r_i^2)$, with $MOI_{ref}$ representing a reference MOI of the object, $\Sigma$ representing a sum, $\rho_{ref}$ representing the reference density of the object, L representing the volume of the object, r representing a radius perpendicular to the axis of rotation, and i representing an arbitrary number of iterations from the axis of rotation to an outermost surface of the object; and
   f. rotating, via the motor of the apparatus, the object about the axis of rotation.

2. The method according to claim 1, further comprising:
   g. during rotation of the object about the axis of rotation, determining, via the motor, a torque applied to the object and determining, via the angular position sensor or angular velocity sensor, an angular acceleration of the object;
   h. deriving a first MOI of the object about the axis of rotation using Equation 3,
   Equation 3 is as follows:

$$MOI_{meas} = \frac{\tau}{\alpha},$$

$MOI_{meas}$ representing a measured MOI of the object, $\tau$ representing a torque applied to the object and a representing an angular acceleration of the object; and
   i. estimating a mass distribution or a mass density of the object by comparing $\rho_{ref}$, $MOI_{meas}$, and $MOI_{ref}$ using Equation 8,
   Equation 8 is as follows: $\rho_{est}=\rho_{ref}* (MOI_{ref}/MOI_{meas})$, Pest representing the estimated mass distribution of the object.

3. The method according to claim 2, further comprising: weighing the object; and
   measuring an external geometry of the object;
   deriving a second MOI from a weight of the object, the external geometry of the object, and a predetermined position of the axis of rotation; and
   using Equation 8 to compare the first MOI and the second MOI to determine the relative mass distribution of the object about the axis of rotation by Equation 8.

4. The method according to claim 2, wherein steps d-i are repeated for a plurality of different axes of rotation.

5. The method according to claim 4, wherein results of the estimated mass distributions are compiled into a map or graphic and are display on a display device.

6. The method according to claim 1, wherein steps d-f are repeated for a plurality of different axes of rotation.

7. An apparatus for measuring a distribution of mass or density of an object, the apparatus comprising:
a frame including:
a top portion;
a base portion spaced from the top portion in a first direction; and
a connecting portion connecting the base portion to the top portion;
a motor connected to the base portion;
an output shaft extending upwardly from the motor;
a first clamp rotatably connected to an upper end of the output shaft;
a second clamp rotatably connected to the top portion and movable relative to the top portion in the first direction; and
an angular position sensor or angular velocity sensor rotatably connected to the motor by a connector.

8. The apparatus of claim 7, further comprising an actuator connected to the second clamp and configured to move the second clamp relative to the first clamp, in order to fix the object between the first clamp and the second clamp.

9. The apparatus of claim 8, wherein the second clamp includes a bearing that allows for relative rotation of the object.

10. The apparatus of claim 7, wherein the motor includes an output shaft, an end of the output shaft directly connected to the first clamp to rotate the first clamp.

11. An apparatus for measuring a distribution of mass or density of an object, the apparatus comprising:
a frame including:
a top portion;
a base portion; and
a connecting portion connecting the base portion to the top portion;
a motor connected to the base portion;
a first clamp rotatably connected to the motor;
a second clamp rotatably connected to the top portion; and
an angular position sensor or angular velocity sensor rotatably connected to the motor by a connector;
a hardware-embedded processor electrically connected to the angular position sensor or angular velocity sensor and to the motor; and
a display device,
wherein the processor is configured to:
control the motor to rotate the first clamp, to cause the object to rotate about a one axis at a time among a plurality of different rotation of axes;
calculate a reference density of the object using Equation 2,
Equation 2 is as follows:

$$\rho_{ref} = \frac{m}{L},$$

with $\rho_{ref}$ representing a reference density of the object, m representing a mass of the object and L representing a volume of the object;
calculate a reference moment of inertia (MOI) using Equation 1,
Equation 1 is as follows: $MOI_{ref} = \rho ref*\Sigma(L_i*r_i^2)$, with $MOI_{ref}$ representing a reference MOI of the object, $\Sigma$ representing a sum, $\rho_{ref}$ representing the reference density of the object, L representing the volume of the object, r representing a radius perpendicular to the axis of rotation, and i representing an arbitrary number of iterations from the axis of rotation to an outermost surface of the object.

12. The apparatus of claim 11, wherein the processor is further configured to:
receive, by the motor, a torque applied to the object;
receive, by the angular position sensor or angular velocity sensor, an angular acceleration of the object;
derive a first MOI of the object about each of the plurality of axes of rotation using Equation 3,
Equation 3 is as follows:

$$MOI_{meas} = \frac{\tau}{\alpha},$$

$MOI_{meas}$ representing a measured MOI of the object, $\tau$ representing the torque applied to the object and a representing the angular acceleration of the object; and
i. estimate a mass distribution of the object by comparing $\rho_{ref}$, $MOI_{meas}$, and $MOI_{ref}$ using Equation 8,
Equation 8 is as follows: $\rho_{est}=\rho_{ref}*(MOI_{ref}/MOI_{meas})$, $\rho_{est}$ representing the estimated mass distribution of the object.

13. The apparatus of claim 12, further comprising a light sensor positioned on a side portion and the top portion of the frame to measure an external geometry of the object,
wherein the processor is further configured to:
derive a second MOI from a weight of the object, the external geometry of the object, and a predetermined position of the axis of rotation; and
using Equation 8 to compare the first MOI and the second MOI to determine the distribution of mass of the object about the axis of rotation by Equation 8.

14. An apparatus for measuring a distribution of mass or density of an object, the apparatus comprising:
a base, an inner shell and outer shell;
wherein the outer shell can move relative to both the inner shell and the base;
wherein the inner shell can move relative to both the outer shell and the base;
a base including a track;
bearings attached to the outer shell and being movable with respect to the track, the bearings permitting the outer shell to move with respect to the base;
a fixture connected to the inner shell via a fitting and a bearing, the fixture being configured to fix the object to the apparatus; and
a first motor including a first shaft and configured to drive the fixture to cause the object, the outer shell, and the inner shell to rotate.

15. The apparatus of claim 14, further comprising:
an angular position sensor or angular velocity sensor; and
a first connector mechanically connecting the first motor to the angular position sensor.

16. The apparatus of claim 15, further comprising:
a second motor including a second shaft and configured to drive rotation of the inner shell.

17. The apparatus of claim 16, further comprising:
a pinion;
a gear; and
a second connector,
wherein the second shaft of the second motor is mechanically connected to the inner shell via the pinion, the gear and the second connector.

18. The apparatus of claim 17, further comprising:
a third motor; and a fitting,
wherein the fixture is loaded onto the fitting, and
wherein the third motor drives the fitting to cause the fixture and the object to rotate.

19. The apparatus of claim 18, further comprising:
a second pinion;
a second gear; and
a third connector,
wherein the third motor is mechanically connected to the fitting via the second pinion, the second gear, and the third connector.

20. The apparatus of claim 19, wherein the first gear and the second gear are concentric about the first shaft to ensure the second connector does not collide with the third connector.

\* \* \* \* \*